(12) United States Patent
Papakostas et al.

(10) Patent No.: US 6,964,205 B2
(45) Date of Patent: Nov. 15, 2005

(54) SENSOR WITH PLURALITY OF SENSOR ELEMENTS ARRANGED WITH RESPECT TO A SUBSTRATE

(75) Inventors: Thomas Papakostas, Boston, MA (US); Christopher George, Lynn, MA (US); Charles Malacaria, Medfield, MA (US); Mark Lowe, Sharon, MA (US)

(73) Assignee: Tekscan Incorporated, South Boston, MA (US)

( * ) Notice: Subject to any disclaimer, the term of this patent is extended or adjusted under 35 U.S.C. 154(b) by 0 days.

(21) Appl. No.: 10/748,718

(22) Filed: Dec. 30, 2003

(65) Prior Publication Data

US 2005/0145045 A1    Jul. 7, 2005

(51) Int. Cl.[7] ................................................. G01D 7/00
(52) U.S. Cl. ................................................. 73/862.046
(58) Field of Search .................... 73/862.041, 862.042, 73/862.043, 862.044, 862.045, 862.046

(56) References Cited

U.S. PATENT DOCUMENTS

| | | |
|---|---|---|
| 2,951,817 A | 9/1960 | Myers |
| 3,349,489 A | 10/1967 | Shackelford |
| 3,386,067 A | 5/1968 | Costanzo |
| 3,503,031 A | 3/1970 | Nyhus et al. |
| 3,562,418 A | 2/1971 | Glasick et al. |
| 3,906,207 A | 9/1975 | Rivere et al. |
| 3,944,740 A | 3/1976 | Murase et al. |
| 3,974,470 A | 8/1976 | DuRocher |
| 3,989,981 A * | 11/1976 | Ogle et al. .................. 345/215 |
| 3,992,212 A | 11/1976 | Youtsey et al. |
| 4,111,058 A | 9/1978 | Gross |
| 4,134,063 A | 1/1979 | Nicol et al. |
| 4,155,262 A | 5/1979 | Wong et al. |
| 4,163,204 A | 7/1979 | Sado et al. |
| 4,190,797 A | 2/1980 | Lecklider et al. |
| 4,203,648 A | 5/1980 | Seidler |
| 4,208,648 A | 6/1980 | Naumann |
| 4,213,348 A | 7/1980 | Reinertson et al. |
| 4,235,141 A | 11/1980 | Eventoff |
| 4,268,815 A | 5/1981 | Eventoff et al. |
| 4,276,538 A | 6/1981 | Eventoff |

(Continued)

FOREIGN PATENT DOCUMENTS

DE    3631923 A1    3/1988

(Continued)

OTHER PUBLICATIONS

Nasa Tech Brief"Pressure-Sensitive Resistor Material" for 1986 from JPL Invention Report NPO-16537/6043.

(Continued)

*Primary Examiner*—Max Noori
(74) *Attorney, Agent, or Firm*—Wolf, Greenfield & Sacks PC

(57) ABSTRACT

A sensor for measuring a parameter applied to a surface is provided. The sensor includes at least one substrate layer, a plurality of individual sensor elements operatively arranged with respect to the substrate layer, and a conductive trace disposed on the substrate layer. The conductive trace is electrically coupled to an individual sensor element and wraps around at least a portion of the sensor element in a spiral-like manner. Further, by employing slits or cut-outs of material between sensor elements, a sensor element may move independent of an adjacent sensor element, thereby allowing the sensor to conform to an irregularly shaped surface or otherwise when subject to relatively large deflections. The sensor may be employed to detect force distribution of a seating surface, such as a seat cushion of a wheelchair.

75 Claims, 13 Drawing Sheets

U.S. PATENT DOCUMENTS

| | | |
|---|---|---|
| 4,301,337 A | 11/1981 | Eventoff |
| 4,306,480 A | 12/1981 | Eventoff |
| 4,314,227 A | 2/1982 | Eventoff |
| 4,314,228 A | 2/1982 | Eventoff |
| 4,315,238 A | 2/1982 | Eventoff |
| 4,319,078 A | 3/1982 | Yokoo et al. |
| 4,402,326 A | 9/1983 | Okano et al. |
| 4,426,884 A | 1/1984 | Polchaninoff |
| 4,433,223 A | 2/1984 | Larson et al. |
| 4,442,716 A | 4/1984 | Coe et al. |
| 4,451,714 A | 5/1984 | Eventoff |
| 4,483,178 A | 11/1984 | Miile |
| 4,488,873 A | 12/1984 | Bloomfield et al. |
| 4,492,949 A | 1/1985 | Peterson et al. |
| 4,495,236 A | 1/1985 | Obara et al. |
| 4,503,416 A | 3/1985 | Kim |
| 4,503,705 A | 3/1985 | Polchaninoff |
| 4,506,250 A | 3/1985 | Kirby |
| 4,518,833 A | 5/1985 | Watkins |
| 4,521,186 A | 6/1985 | Wodlinger et al. |
| 4,529,959 A | 7/1985 | Ito et al. |
| 4,555,953 A | 12/1985 | Dario et al. |
| 4,555,954 A | 12/1985 | Kim |
| 4,634,623 A | 1/1987 | Watkins |
| 4,684,563 A | 8/1987 | Hayashi et al. |
| 4,695,963 A | 9/1987 | Sagisawa et al. |
| 4,734,034 A | 3/1988 | Maness et al. |
| 4,771,638 A | 9/1988 | Sugiyama et al. |
| 4,781,056 A | 11/1988 | Noel et al. |
| 4,856,993 A | 8/1989 | Maness et al. |
| 4,996,511 A | 2/1991 | Ohkawa et al. |
| 5,010,774 A | 4/1991 | Kikuo et al. |
| 5,033,291 A | 7/1991 | Podoloff et al. |
| 5,060,527 A | 10/1991 | Burgess |
| 5,086,652 A | 2/1992 | Kropp |
| 5,086,785 A | 2/1992 | Gentile et al. |
| 5,159,159 A | 10/1992 | Asher |
| 5,170,663 A | 12/1992 | Kovacevic |
| 5,222,399 A | 6/1993 | Kropp |
| 5,237,879 A | 8/1993 | Speeter |
| 5,302,936 A | 4/1994 | Yaniger |
| 5,323,650 A | 6/1994 | Fullen et al. |
| 5,361,133 A | 11/1994 | Brown et al. |
| 5,374,282 A | 12/1994 | Nichols et al. |
| 5,375,397 A | 12/1994 | Ferrand et al. |
| 5,408,873 A | 4/1995 | Schmidt et al. |
| 5,429,006 A | 7/1995 | Tamuri |
| 5,431,064 A | 7/1995 | Franz |
| 5,505,072 A | 4/1996 | Oreper |
| 5,515,738 A | 5/1996 | Tamuri |
| 5,541,570 A | 7/1996 | McDowell |
| 5,571,973 A | 11/1996 | Taylot |
| 5,583,303 A | 12/1996 | Franz |
| 5,612,876 A | 3/1997 | Zeidler et al. |
| 5,678,448 A | 10/1997 | Fullen et al. |
| 5,736,656 A | 4/1998 | Fullen et al. |
| 5,756,904 A | 5/1998 | Oreper et al. |
| 5,799,533 A | 9/1998 | Seki et al. |
| 5,877,436 A | 3/1999 | Faust et al. |
| 5,905,209 A | 5/1999 | Oreper |
| 5,989,700 A | 11/1999 | Krivopal |
| 6,006,386 A | 12/1999 | Mohaupt |
| 6,011,477 A * | 1/2000 | Teodorescu et al. ..... 340/573.1 |
| 6,025,725 A * | 2/2000 | Gershenfeld et al. ....... 324/652 |
| 6,032,542 A | 3/2000 | Warnick et al. |
| 6,038,935 A | 3/2000 | Fullen et al. |
| 6,137,171 A * | 10/2000 | Joshi .......................... 257/723 |
| 6,188,331 B1 | 2/2001 | Zee et al. |
| 6,223,606 B1 | 5/2001 | Burke et al. |
| 6,225,814 B1 | 5/2001 | Oreper et al. |
| 6,272,936 B1 | 8/2001 | Oreper et al. |
| 6,289,747 B1 | 9/2001 | Billen et al. |
| 6,430,475 B2 | 8/2002 | Okamoto et al. |
| 6,507,169 B1 * | 1/2003 | Holtom et al. .............. 320/106 |
| 6,522,128 B1 * | 2/2003 | Ely et al. ................ 324/207.17 |
| 6,531,951 B2 | 3/2003 | Serban et al. |
| 6,534,970 B1 * | 3/2003 | Ely et al. ................ 324/207.17 |
| 6,690,014 B1 * | 2/2004 | Gooch et al. ............. 250/338.4 |

FOREIGN PATENT DOCUMENTS

| | | |
|---|---|---|
| DE | 4237072 C1 | 12/1993 |
| EP | 0223355 | 5/1987 |
| EP | 1050057 B1 | 1/1999 |
| GB | 2115555 A | 9/1983 |
| GB | 2192186 A | 1/1988 |
| JP | 56 142430 A | 11/1981 |
| JP | 58 182746 A | 10/1983 |
| JP | 61-207939 | 9/1986 |
| JP | 62 102127 A | 5/1987 |
| JP | 01 032138 A | 2/1989 |
| JP | A-2-158105 | 6/1990 |
| WO | WO 94/15530 | 7/1994 |
| WO | WO 03/052368 A1 | 6/2003 |

OTHER PUBLICATIONS

Spolet & Lippert "An Instrumented Shoe—A Portable Force Measuring Device" J. Blumechance, 1976, vol. 9, pp 779-783, Pentagon Press.

S. Miyazaki & H. Iwakura, "Foot-force Measuring Device for Clinical Assessment of Pathological Gait", Medical & Biological Engineering & Computing, Jul. 1978, pp. 429-436.

* cited by examiner

SENSOR WITH PLURALITY OF SENSOR ELEMENTS ARRANGED WITH RESPECT TO A SUBSTRATE

FIELD OF INVENTION

The present invention relates generally to sensors, and more particularly to a sensor that includes a plurality of sensor elements formed on a relatively thin substrate material.

DISCUSSION OF RELATED ART

Sensors exist that record forces or pressures on surfaces. In one example, the sensor is formed on a thin flat substrate. In particular, as shown in FIG. 1, which is a diagrammatic representation of an assembled prior art sensor, the sensor 10 includes a plurality of row electrodes 20a formed on a first half of a relatively thin substrate material 40 and a plurality of column electrodes 20b formed on a second half of the relatively thin substrate. The first half of the substrate is then folded onto or otherwise placed over the second half such that the row and column electrodes intersect. A sensor element 30 is disposed between the substrate layers at the intersection of a row and column electrode. To create the sensor element, a pressure sensitive ink is deposited at the intersection of and between a row electrode 20a and a column electrode 20b prior to placing the first substrate onto the second. The conductive ink is electrically coupled to the row and column electrodes. Forces acting at the intersection cause a corresponding change in the electrical resistance of the pressure sensitive ink, which, by way of the column and row electrodes, is subsequently detected by a control circuit. The resulting pressure sensor in FIG. 1 is arranged as a sensor array, with individual sensor elements arranged in rows 42 and columns 44. One example of such a sensor is described in commonly assigned U.S. Pat. No. 4,856,993, which is hereby incorporated herein in its entirety.

SUMMARY OF THE INVENTION

In one embodiment, a sensor is provided. The sensor includes at least one substrate layer and a plurality of individual sensor elements operatively arranged with respect to the substrate layer. First and second conductive traces are disposed on the substrate layer. Each conductive trace is electrically coupled to at least one sensor element and each conductive trace is spaced out from and extends at least partially around the at least one sensor element in a spiral-like pattern.

In another embodiment, a sensor adapted to conform to the shape of a surface is provided. The sensor includes a substrate layer and a plurality of individual sensor elements for measuring a desired parameter. The plurality of sensor elements defines a sensor plane. The sensor elements are arranged with respect to the substrate layer in a manner that allows each sensor element to move in a direction perpendicular to the sensor plane and substantially independent of an adjacent sensor element moving in a direction perpendicular to the sensor plane.

In yet another embodiment, a sensor array for measuring a desired parameter is provided. The sensor includes a substrate layer and a plurality of individual sensor elements operatively arranged with respect to the substrate layer, defining a sensor plane. The sensor also includes a plurality of conductive traces connecting the sensor elements. Each sensor element is in direct electrical contact with at least one respective conductive trace. A plurality of slits is formed in the substrate layer. The slits are arranged between each adjacent sensor element. The slits permit a sensor element to move perpendicular to the sensor plane.

In yet one more embodiment, a force sensor for measuring a force applied to a surface is provided. The sensor includes first and second thin, flexible substrate layers, the layers arranged in facing relationship to each other, and a first plurality of conductive traces formed on the first substrate layer and a second plurality of conductive traces formed on the second substrate layer, with the first and the second conductive traces facing each other. The sensor further includes a plurality of individual force sensor elements disposed between the first and the second substrate layers, and electrically connected to the first and second conductive traces. The first and second conductive traces each have a portion that extends from and partially around the sensor element in a spiral-like pattern. A plurality of slits is formed through the first and second substrate layers. The slits permit the sensor elements to move, thereby allowing a sensor element to move relative to adjacent sensor elements.

Various embodiments of the present invention provide certain advantages and overcome certain limitations of prior sensors. Embodiments of the invention may not share the same advantages, and those that do may not share them under all circumstances. Further, the elements of a particular sensor embodiment described herein may be arranged in any suitable combination to provide a different embodiment, as the present invention is not limited in this respect.

BRIEF DESCRIPTION OF THE DRAWINGS

Various embodiments of the invention will now be described, by way of example, with reference to the accompanying drawings, in which.

DESCRIPTION OF ILLUSTRATIVE EMBODIMENTS

Figure 1:
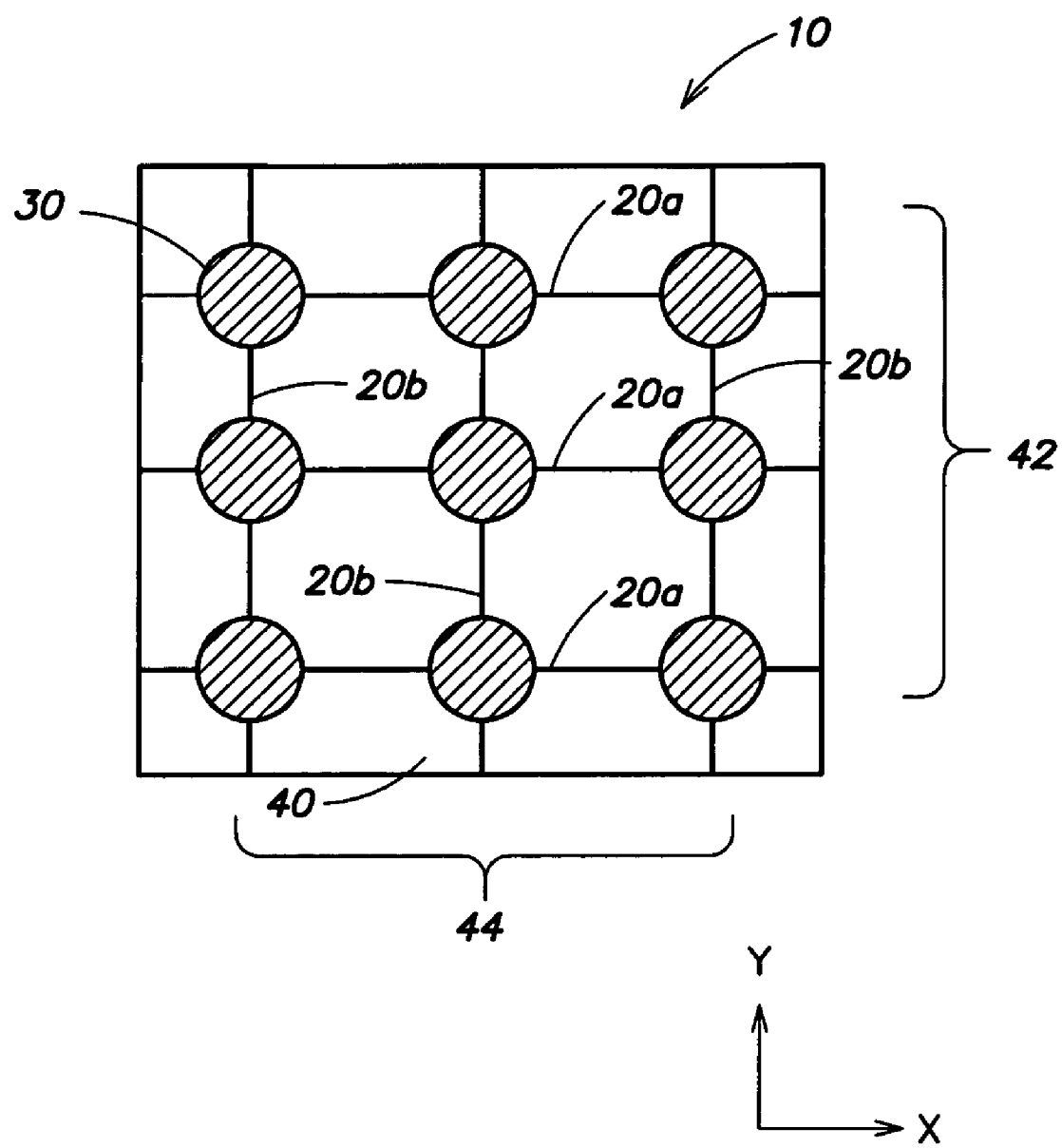
FIG. 1 is a diagrammatic representation of a portion of a conventional force sensor.

Aspects of the invention are directed to sensors having a network of sensor elements arranged on a substrate, in a manner similar to prior force sensors, such as that described with reference to FIG. 1 above. However, according to one aspect of the invention, at least a portion of the conductive trace electrically coupled to an individual sensor element is spaced from and wraps at least partially around the sensor element.

In some instances, it may be desirable to record desired parameters or measurements, such as temperature, pressure, force, vibration, etc., over an irregularly shaped (e.g., curved, non-planar, etc.) surface or one subjected to large deformations. While prior sensors accurately measure forces applied over a relatively planar surface, such a sensor may wrinkle when applied to an irregularly shaped surface or when subjected to large deformations and therefore may not as accurately record the applied forces. Therefore, according to another aspect of the invention, the sensor includes individual sensor elements that can move relative to an adjacent sensor element such that that sensor may more readily follow the contours of the surface of the workpiece or otherwise follow the deformation of the workpiece surface when it is subjected to a deflecting force. Utilizing such a conforming sensor, a more accurate recording of information, such as the force, pressure, temperature, or vibration, etc., acting on a surface, may be obtained. It should be appreciated that, although the above-described sensor may be advantageous when measuring parameters on irregularly shaped surfaces or surfaces subjected to large deformations, the present invention is not limited in this respect, as such a sensor may also be used to detect desired parameters on a planar surface.

As will be explained in more detail below, the substrate may include slits arranged between adjacent sensor elements or groups of sensor elements, or may employ cut-outs, where material between sensor elements or groups of sensor elements is removed, or a combination of slits and cut-outs, to free an individual sensor element or group of sensor elements from the others so that the individual sensor elements or group of sensor elements can move relative to the other sensor elements.

In some embodiments, the sensor elements are arranged in a grid-like pattern whereas in other embodiments, the sensor elements are arranged in a random pattern on the substrate. It should be appreciated that the present invention is not limited in this respect, as other arrangements, such as a repeating, non grid-like pattern, may be employed.

Although certain embodiments described herein are directed to measuring forces, the present invention is not limited in this respect, as the sensor may be employed to detect other parameters such as, pressure, temperature, vibration, etc., or any combination of these or other parameters.

Figure 2:
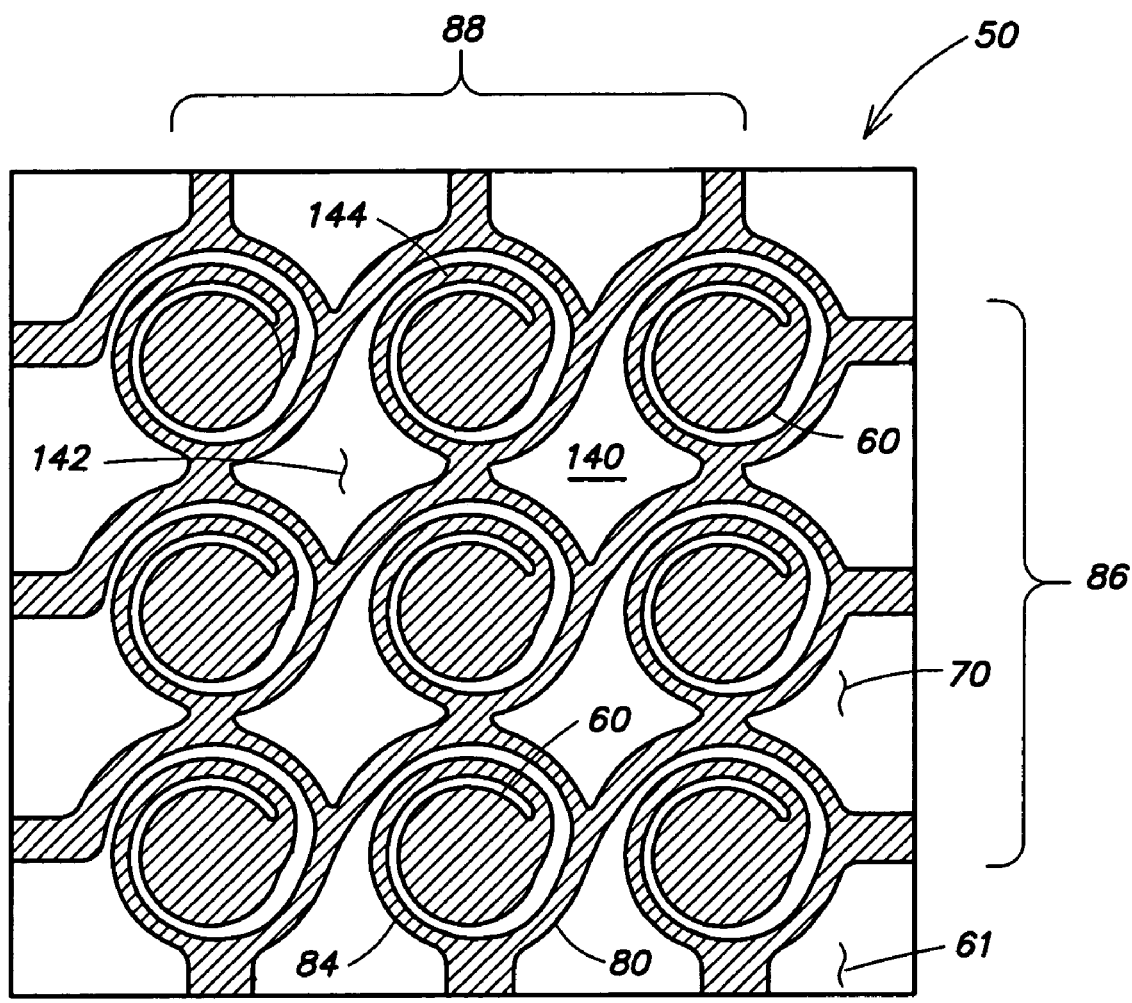
FIG. 2 is a diagrammatic representation of a portion of one embodiment of a sensor of the present invention.

Turning now to the drawings, and in particular to FIG. 2, a portion of an assembled sensor 50 according to one aspect of the invention is shown. The sensor 50, which may be configured as a force sensor, pressure sensor, temperature sensor, vibration sensor, or any other parameter sensor, includes a plurality of sensor elements 60. The sensor includes a top substrate layer 61 formed of a flexible material on which a plurality of upper electrodes (also referred to as upper conductive traces) is formed and a bottom substrate layer (not shown) formed of flexible material on which a plurality of lower electrodes (also referred to as lower conductive traces) is formed. Each conductive trace includes a sensor element pad, formed of an enlarged area of the conductive trace, that is electrically coupled to a sensor element, such that the sensor element is located between and electrically coupled to an upper conductive trace and a lower conductive trace. As will be explained in more detail below, when the sensor element is formed as a force sensor, a pressure sensitive layer is disposed between the upper and the lower conductive traces and, in one embodiment, on the sensor element pad. It should be appreciated that the present invention is not limited in this respect and that a sensor element pad need not be employed. In this regard, the sensor element may be disposed on the main portion of the conductive trace. An insulating layer or layers may be disposed between the top and bottom substrate layers to insulate the upper and lower conductive traces from each other. Each conductive trace 80 is connected to a respective terminal (not shown) through which electrical connection to the conductive trace and subsequently the sensor element is made.

The sensor arrangement described thus far with respect to FIG. 2 is similar in construction to that described above with reference to FIG. 1, including the sensor described with reference to commonly assigned U.S. Pat. No. 4,856,993. However, in the illustrative example of FIG. 2, the conductive trace is connected to at least one sensor element and has a portion that is spaced out from and extends at least partially around the at least one sensor element. In this manner, at least a portion 84 wraps in a spiral manner around the sensor element.

In this particular embodiment, although the sensor elements are arranged in an array on the substrate 70 in rows 86 and columns 88, as will be discussed below, the present invention is not limited in this respect.

As described above, in some instances, it may be advantageous to allow the sensor to conform to an irregularly shaped surface or one that is subject to relatively large deflections upon the application of a force. In one embodiment, one of the plurality of sensor elements can move independently of other sensor elements. Thus, if a deflecting force is applied on two adjacent sensor elements 60, both sensor elements may move as a result of the deflection, but movement of a particular sensor element merely due to movement of an adjacent sensor element is limited. This independent movement of sensor elements 60 will aid in causing the sensor to better conform to the surface.

It should be appreciated that although in the embodiment described above, movement of each sensor element is substantially independent of movement of an adjacent sensor element, the present invention is not limited in this respect. For example, groups of two or more sensor elements may be constrained to move together, yet movement of a particular group of sensor elements is substantially independent of the movement of an adjacent sensor element or group of sensor elements.

In one embodiment, the sensor is formed with a plurality of cut-outs to allow the sensor element to move. In particular, referring again to FIG. 2, portions of the sensor material (e.g., substrate, insulating layer, etc.) are removed from suitable locations to allow each sensor element to move relative to another sensor element. In the embodiment shown, cut-outs are formed at locations between sensor elements 60 and conductive traces. For example, the cut-outs are formed at locations bordering the conductive traces 80 and the sensor elements 60 such that the shape of the cut-out substantially corresponds to the shape of the space between the conductive traces 80/sensor elements 60. As shown in FIG. 2, in one embodiment, at least one cut-out 140 formed in the sensor 50 is positioned between multiple sensor elements and is generally diamond or kite shaped. This generally diamond or kite shaped cut-out 142 may include a tail section 144, which extends about at least a portion of one sensor element 60, as it follows adjacent to the conductive trace. The cut-out may be spaced from the conductive trace and sensor element.

As discussed above, groups of two or more sensor elements may be constrained to move together yet movement of a particular group of sensor elements is substantially independent of the movement of an adjacent sensor element or group of sensor elements. This may be accomplished in the foregoing example by physically joining individual sensor elements together (e.g., material is not removed between sensor elements of the group).

Figure 3A:
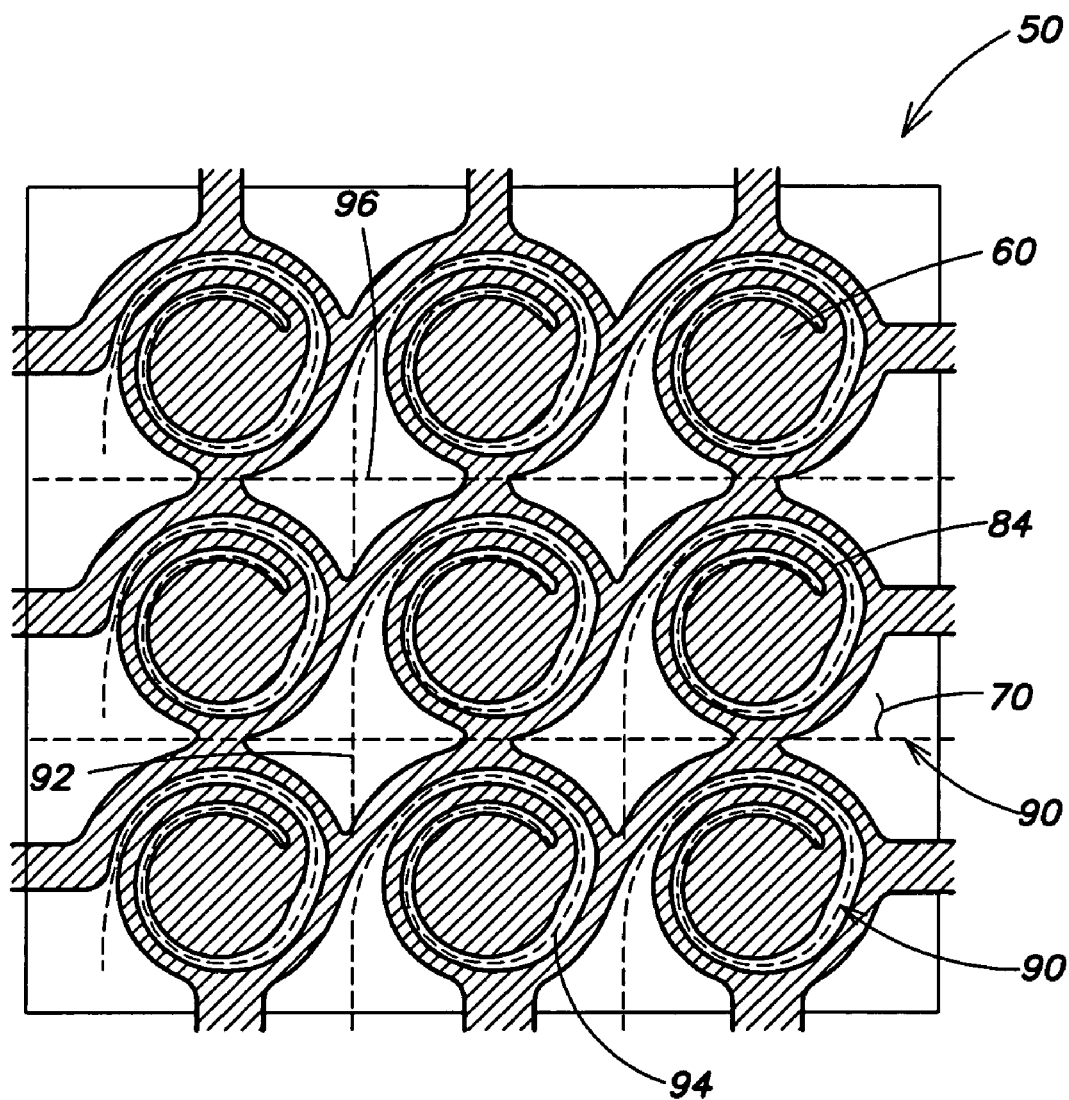
FIG. 3A is a diagrammatic representation of a portion of the sensor according to another embodiment of the present invention.

Rather than form cut-outs, in one embodiment, the sensor is formed with a plurality of slits to allow the sensor element or group of sensor element to move. In FIG. 3A, a portion of the sensor 50 is shown and includes a plurality of slits 90 (indicated as dashed lines) formed through the substrate layer 70 and any intervening layers (e.g., insulating layers). The plurality of slits 90 are positioned at suitable locations to allow at least one sensor element to move relative to another. In the embodiment shown in FIG. 3A, portions of the slits 90 are formed adjacent to the portion 84 of the conductive trace which extends around a sensor element whereas other portions of the slits 90 are positioned between multiple sensor elements 60. The slits can be any suitable shape, (e.g. linear or non-linear) as the present invention is not limited in this respect. For example, as shown in FIG. 3A, the slits include a portion 92 following a linear path and a portion 94 following a nonlinear path. Other shapes may be employed, as the present invention is not limited in this respect.

To provide additional movement of the sensor element, as shown in FIG. 3A, an additional slit may be employed and may intersect other slits to form an intersecting slit 96. The intersecting slit 96 may be positioned between multiple sensor elements as shown.

In another embodiment, one or more slits follows the shape of at least a portion of the conductive trace in much the same manner as the cut-outs follow the area bounded by the traces and sensor elements.

Figure 3B:
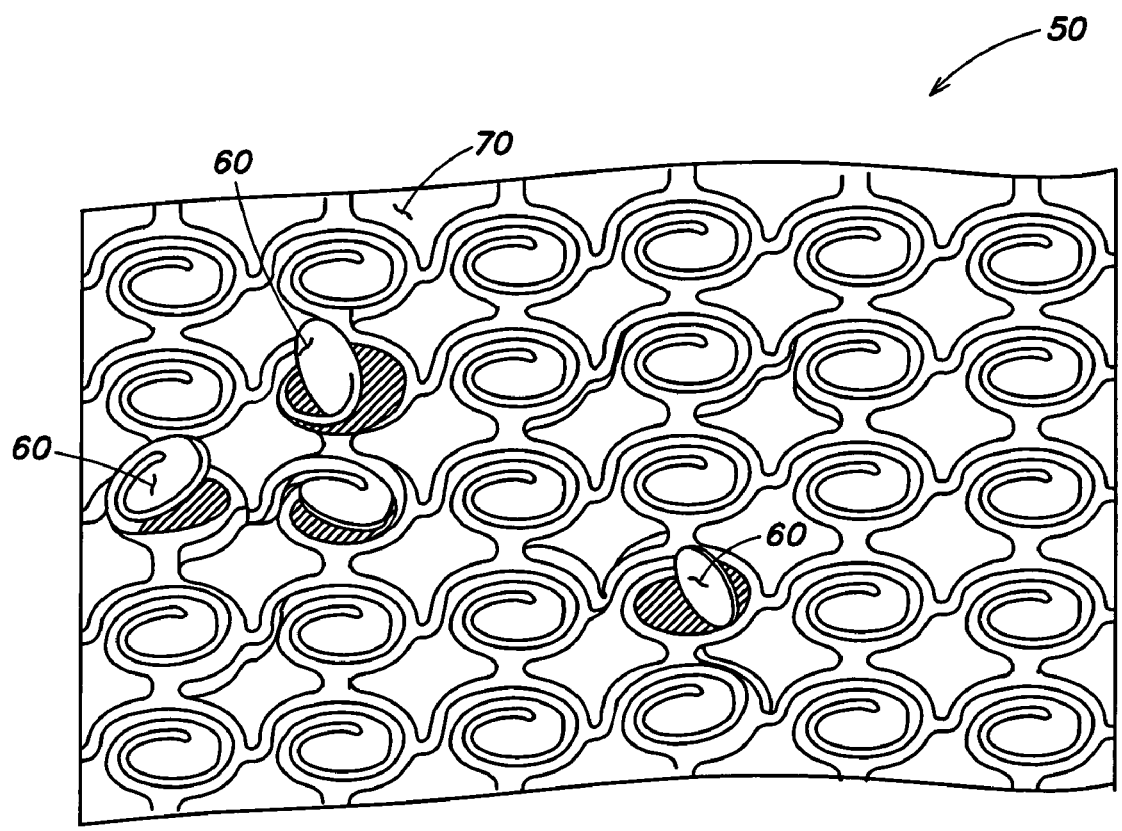
FIG. 3B is a diagrammatic perspective view of a sensor element that is free to move relative to surrounding sensor elements.

FIG. 3B is a diagrammatic perspective view of a portion of a sensor 50, including the slits formed adjacent the conductive traces and sensor elements to produce a generally diamond or kite shaped slit, where the individual sensor elements are free to move relative to the surrounding sensors. As can be seen, a sensor element 60 can thus move in a direction perpendicular to the plane of the substrate 70. In addition, the sensor elements may also move in a direction within the plane of the sensor. Further, the sensor elements may move in a diagonal direction to extend both in a direction out of the plane of the substrate and in a direction parallel to the plane. This sensor element movement may be advantageous because it enhances the stretchability and conformability of the sensor.

As illustrated in FIGS. 2, 3A and 3B, the sensor arrangement allows each sensor element to move in a direction perpendicular to the sensor plane (i.e. in the z-axis) and/or in a direction parallel to the sensor plane (x-axis and y-axis) with each conductive trace extending in a spiral pattern about its respective sensor element. This embodiment may help to disassociate adjacent sensor elements, such that movement of one sensor element will not substantially contribute to movement of another sensor element. Movement of each sensor element in the x, y, and z axis may lead to more accurate designations of the location and magnitude of the sensed parameter across a surface. This additional sensor element movement may further allow the sensor to conform to an irregular-shaped surface.

The amount of movement experienced by an individual sensor element may depend on a number of factors. For example, the length, width, and material of the conductive trace may determine the amount of sensor element movement. Typically, the longer the conductive trace (e.g. the longer the spiral around an individual sensor element), the greater the capability for movement. Also, the thicker the conductive trace, the less capability for movement. Further, in general, the more rigid the material of the conductive trace, the less movement. In one embodiment, the sensor element movement in the z-axis is approximately 1 cm.

Figure 4:
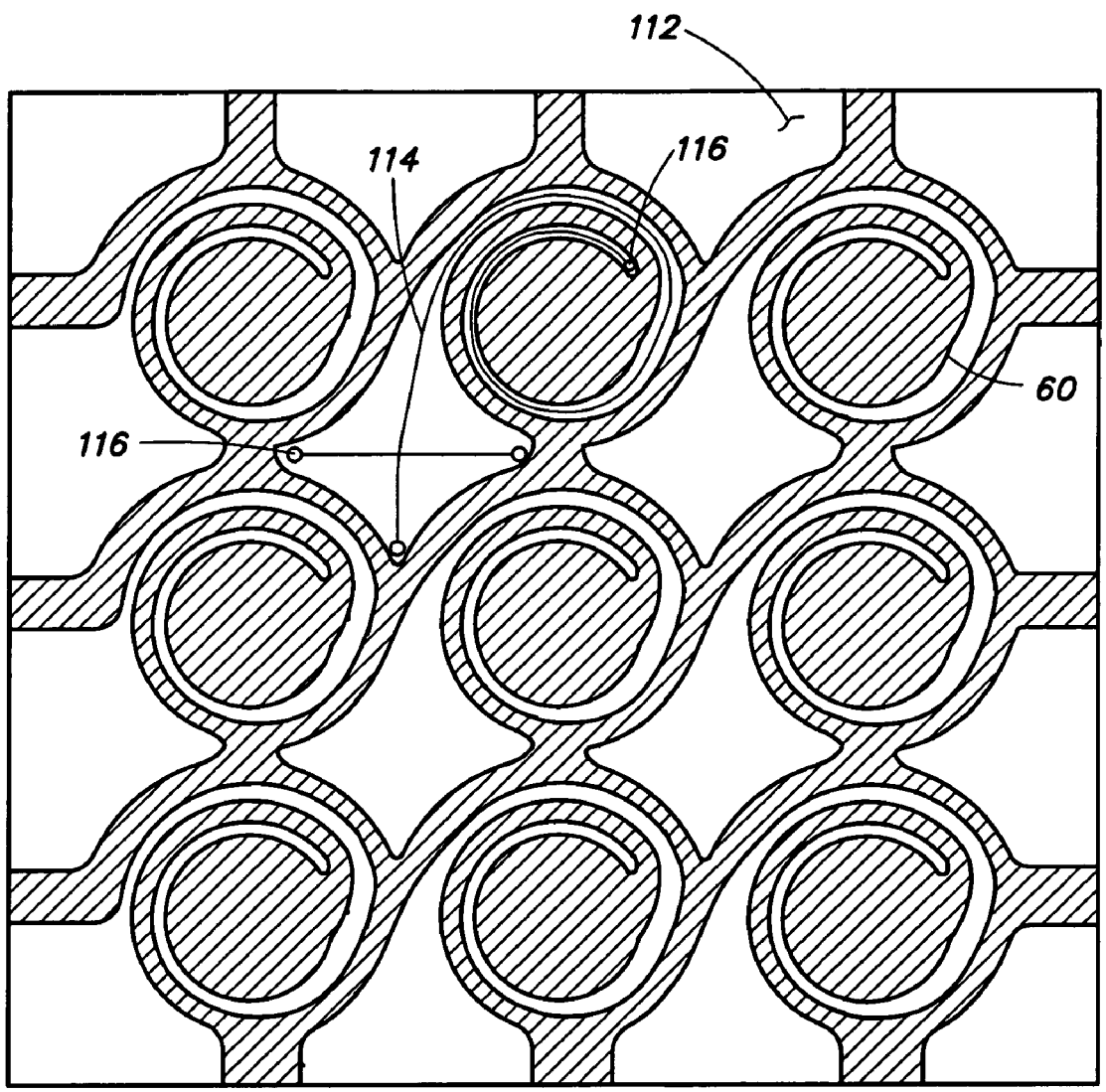
FIG. 4 is a diagrammatic representation of an alternative embodiment of the sensor of FIG. 3A.

As the sensor conforms to the contours of a surface, or conforms to the deformation of a workpiece when subjected to a deflecting force, stress may occur at the edges or end of a slit formed in the substrate layer. Depending upon the material of the substrate layer 70 and any intervening layers (e.g., insulating layers), the substrate layer may tear that may result in damaging the electrical connection. To prevent a slit from propagating, in one embodiment, it may be advantageous to include stress relief holes positioned at the end of the slit. These holes reduce the likelihood of slit propagation by eliminating the points of weakness on the substrate. In one embodiment, shown in FIG. 4, relatively small stress relief holes 116 are formed on both ends of a slit 114.

Figure 5:
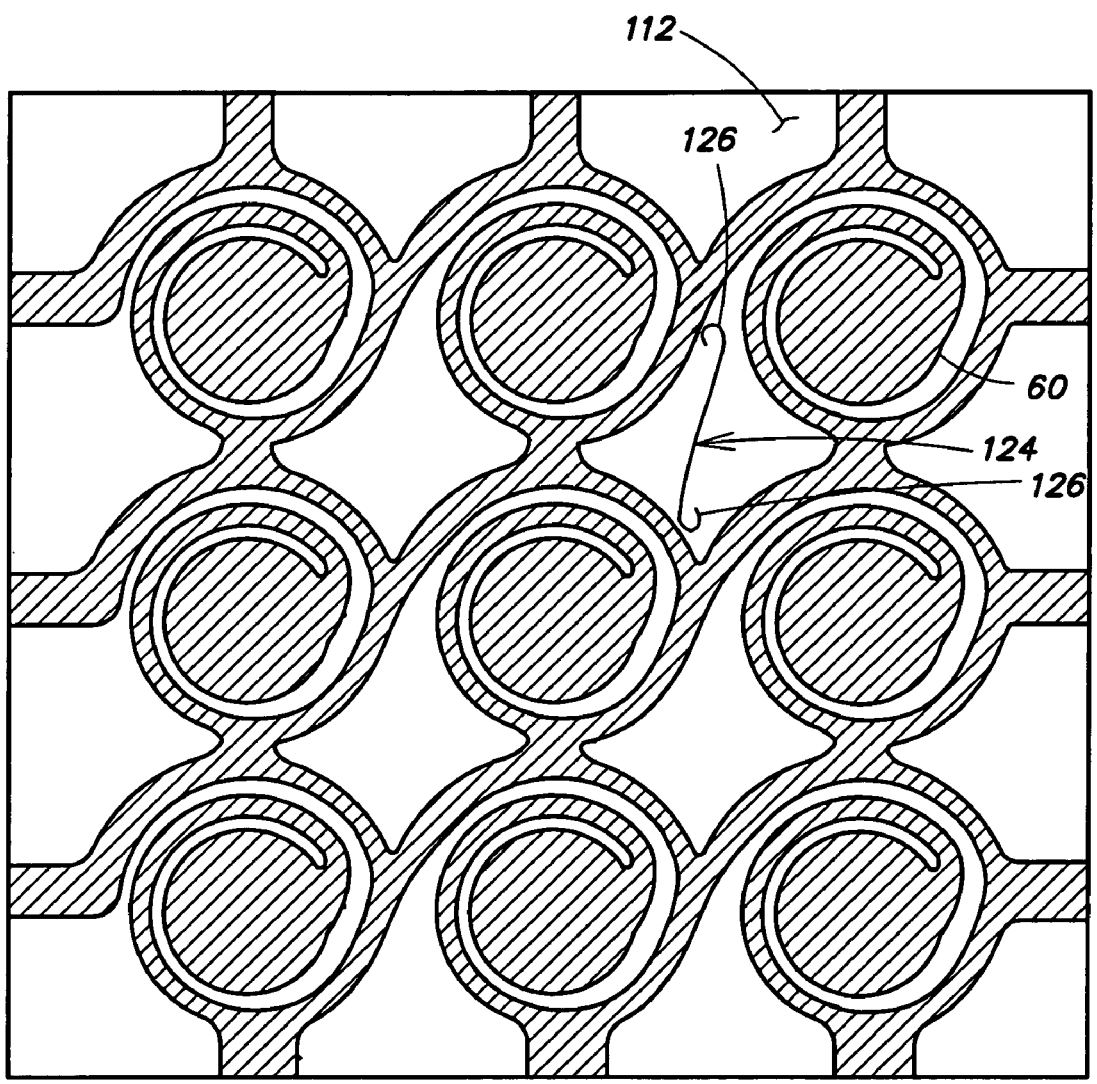
FIG. 5 is a diagrammatic representation of an alternative embodiment of the sensor of FIG. 3A.

In another embodiment, slit propagation may be minimized by providing the ends of the slit with a gradual curve. Also terminating the slit in a hook-shaped pattern may help to minimize slit propagation. In the embodiment shown in FIG. 5, a slit 124 is formed on the substrate layer 112, with a hook-shaped curve 126 positioned at each end point of the slit. When the substrate layer 112 is subjected to a relatively high stress, the slit on the substrate layer may tear, but as the tear propagates, it will terminate back into the slit. Although this may result in a small hole in the substrate material, the likelihood that tear will propagate into surrounding areas of the substrate layer 112 is minimized. Further, if a tear results in a small hole in the substrate material, the hole itself will act as a stress relief, and as described above, will reduce additional tearing of the substrate layer.

Figure 6:
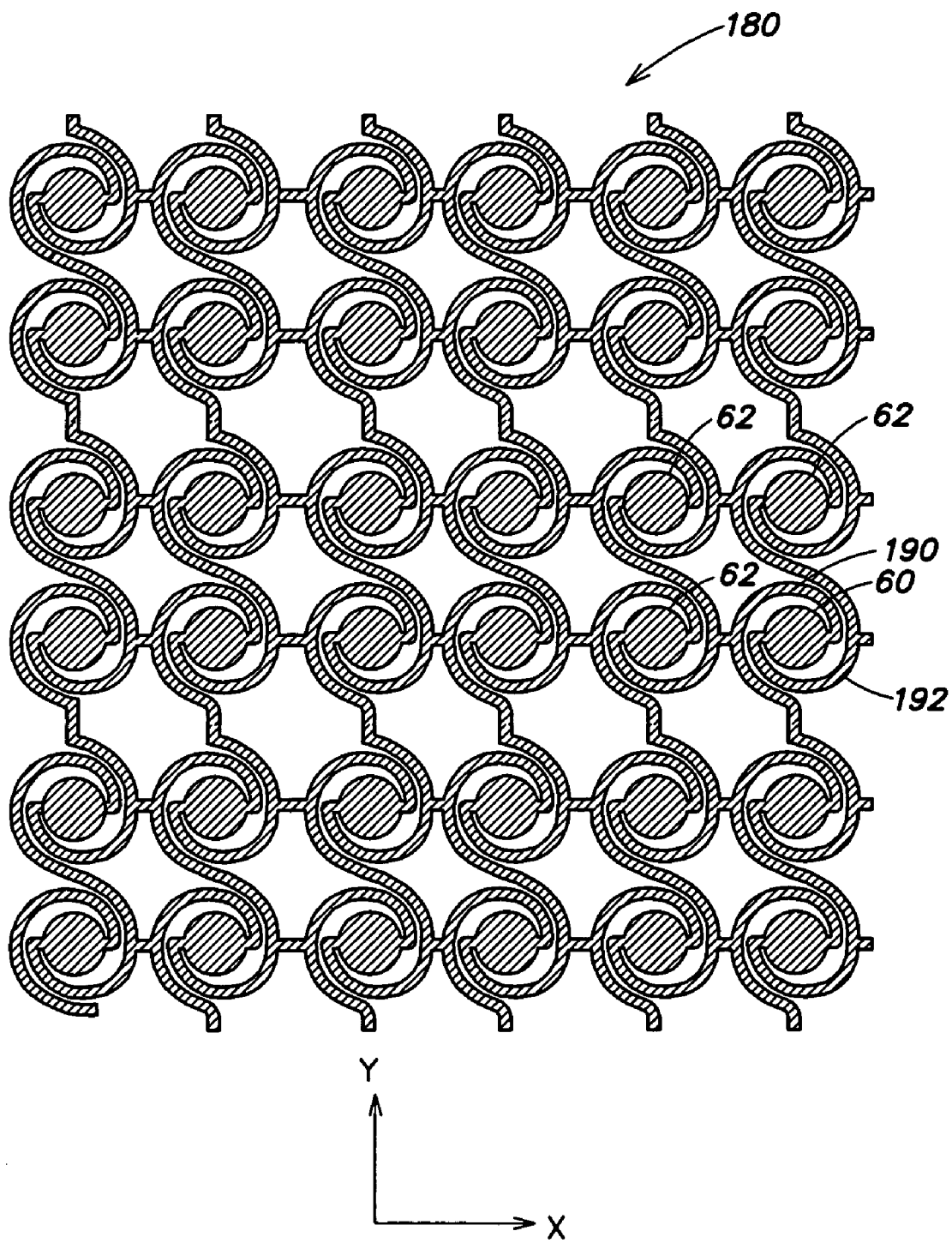
FIG. 6 is a diagrammatic representation of a portion of another embodiment of the sensor.

In another embodiment, each sensor element may be coupled to a conductive trace at more than one location on the sensor element. As shown in FIG. 6, sensor 180 includes conductive traces 190, 192 that extend about a respective sensor element 60 in a spiral pattern. Such a sensor 180 may further include one or more of any of the above-mentioned slits or cut-outs formed in the substrate to allow each sensor element 60 to move independent from adjacent sensor elements 62. In this manner, the sensor element is supported in at least two locations about the sensor element, yet can move as may be desired.

Figure 7:
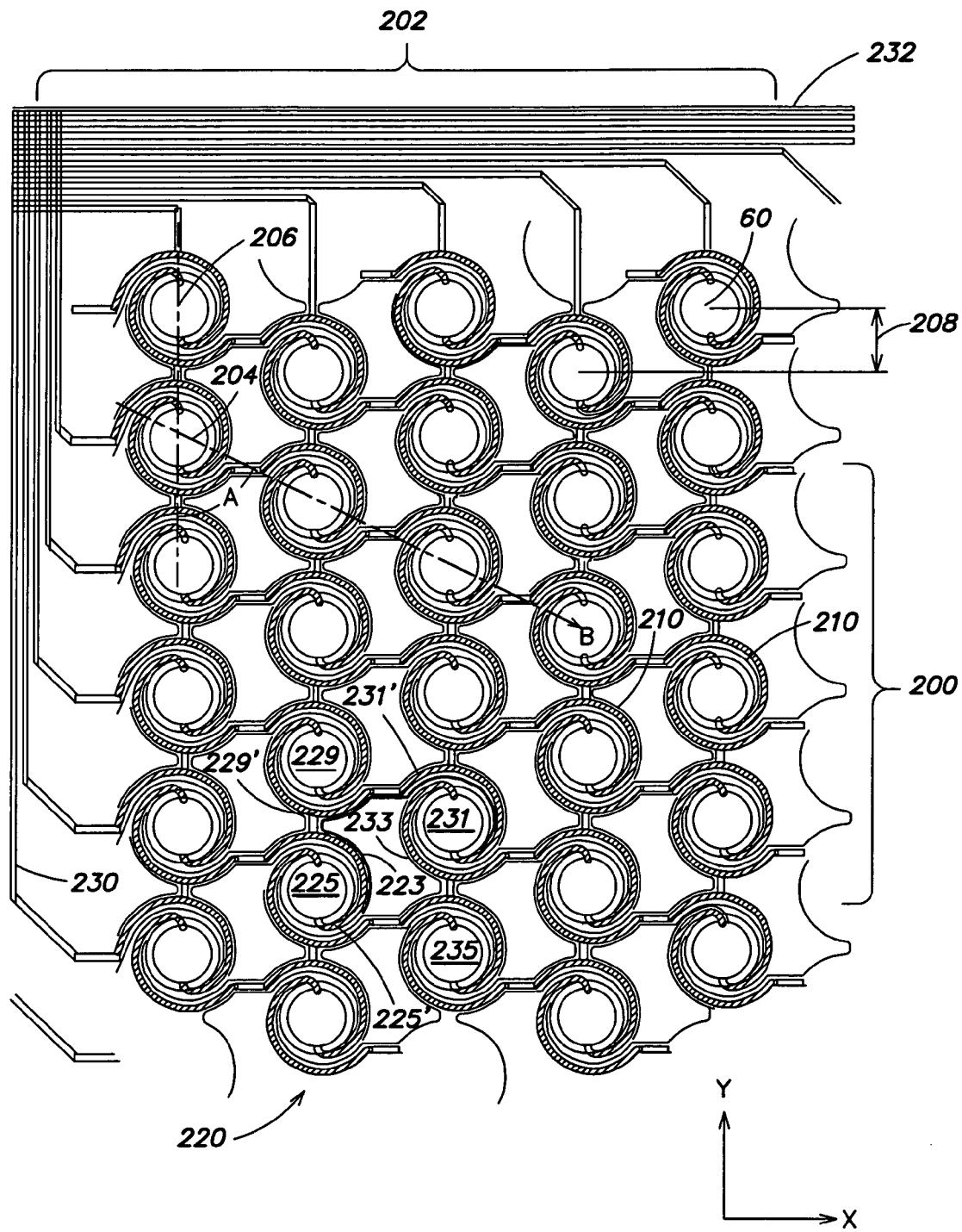
FIG. 7 is a diagrammatic representation of an alternative embodiment of the sensor of FIG. 6.

While many of the previously described embodiments illustrate a sensor with the sensor elements and conductive traces arranged in linear rows and columns perpendicular to each other, in another illustrative embodiment as shown in FIG. 7, rows 200 and columns 202 of sensor elements 60 are arranged in an offset manner such that a row 204 of connected sensor elements and a column 206 of connected sensor elements 60 are not perpendicular to each other. The path of each row 204 and column 206 of sensor element is determined by the pattern of each conductive trace layer. In one embodiment, as shown in FIG. 7, a row 204 of sensor elements is positioned at an angle A, which is less than 90 degrees, and approximately 60 degrees, relative to a column 206 of sensor elements. This particular embodiment is achieved by a linear offset 208 of every other column with respect to an adjacent column of sensor elements 60. It should be appreciated that the present invention is not limited in this respect and that other suitable offset angles may be employed, such as 30 degrees and 45 degrees.

It should be appreciated that the conductive traces lying in a row and/or column are not necessarily straight. Rather, the traces, while continuous, are formed along any desired path, and are designated as extending or lying in a row or column. That is, one conductive trace extending in any desired path is separated in a row-like or column-like fashion from an adjacent conductive trace.

As described above, to allow the sensor 220 to conform to an irregularly shaped surface or one subject to high deflections, slits 210 may be provided in the substrate (e.g., between the conductive traces and/or sensor elements). In the embodiment described with reference to FIG. 7, when viewing any four adjacent sensor elements (225, 229, 231, 235), two slits are provided. As shown in more detail with reference to FIG. 7, slit 223 (which is indicated with a bold line) follows portions of conductive traces 225', 229', and 231'. A similarly shaped slit 233 extends between sensor elements 231, 235 and 225. The two slits, although independent, exhibit an hour-glass shape between the four sensor elements, with a tail extending off the upper and lower portions of the hour glass shape.

The shape of the slits 233, 223 may aid in the individual movement of the sensor elements. This sensor element and slit shape and/or placement may be advantageous in that it may permit sensor element movement in the diagonal direction of arrow B, or further in the direction of arrow B, as compared to an arrangement where the sensor elements are arranged in a matrix of linear rows and columns perpendicular to each other. It should be appreciated that the offset 208 between sensor elements may change the shape of the slits.

Figure 8:
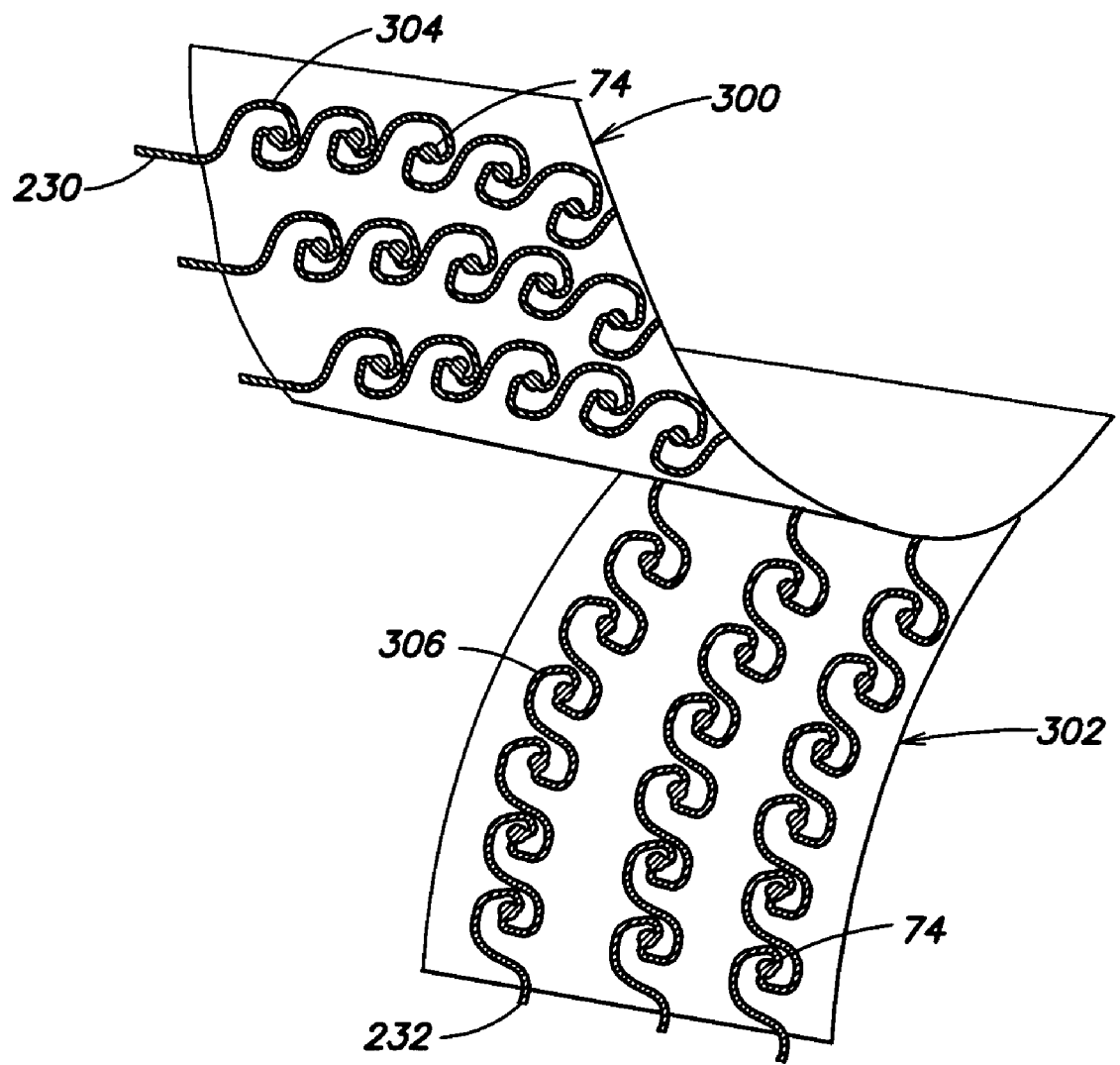
FIG. 8 is a diagrammatic perspective view of a sensor prior to assembly.
Figure 9:
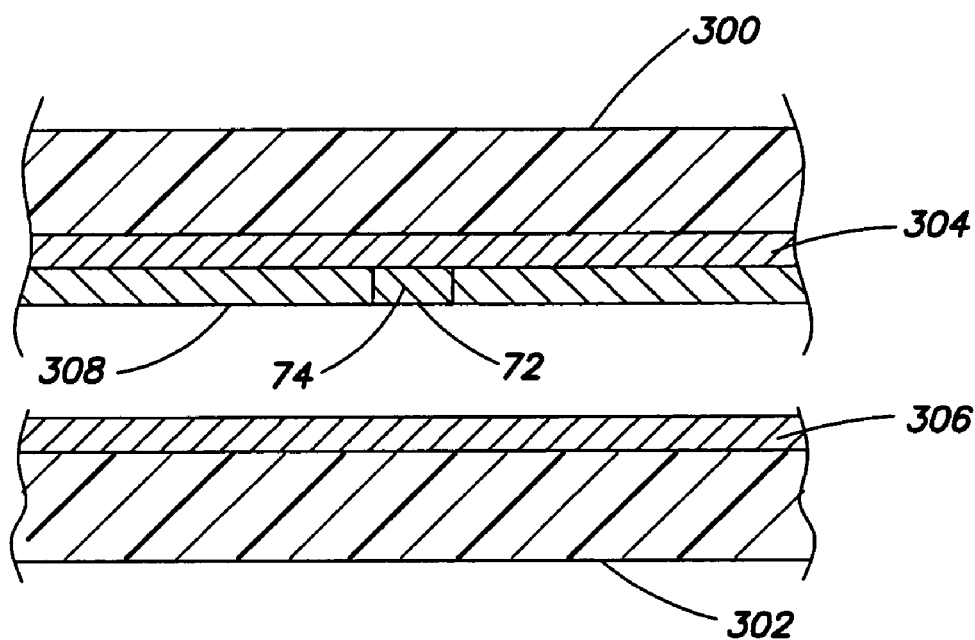
FIG. 9 is a diagrammatic cross-sectional view of one embodiment of the sensor of the present invention.
Figure 10:
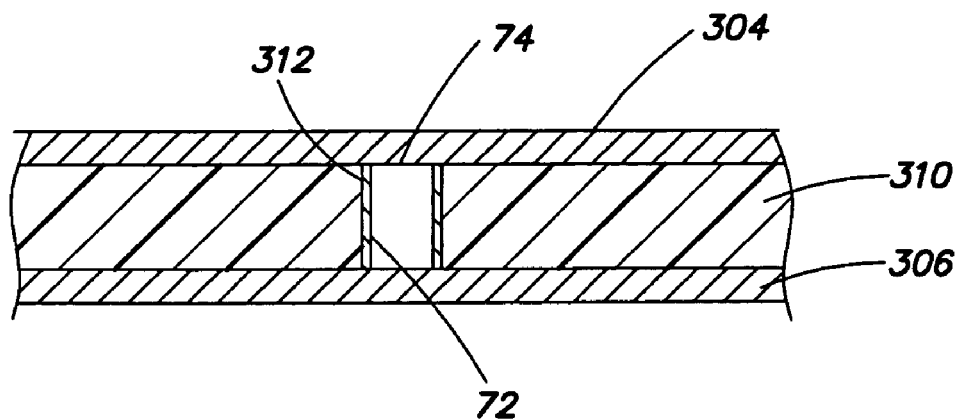
FIG. 10 is diagrammatic cross-sectional view of another embodiment of the sensor of the present invention.

Referring to FIGS. 8–10, the construction of the sensor shown, for example, in FIG. 6, is described in more detail. FIG. 8 illustrates the upper and lower substrate layers 300, 302, each with its respective conductive trace 304, 306. In one embodiment, the substrate layers 300, 302 are formed of a polyester film such as Mylar. Other films, such as Kapton manufactured by DuPont, may be used. Of course, the present invention is not limited in this respect as other suitable substrate materials may be used.

The conductive traces 304, 306 may be formed using any suitable technique. For example, methods for making flexible printed circuits may be employed. In this respect, the upper conductive trace 304 is applied to the top substrate layer 300 by directly printing an electrically conductive ink. Other methods may be used to fabricate the conductive trace including photo-etching copper laminated to a Mylar or other suitable substrate material. Screen printing may also be used.

Next, the locations 74 on the conductive trace defining the sensor elements are coated with a coating 72. When forming a pressure or force sensor, coating 72 is formed of a pressure-sensitive ink, examples of which will be discussed below. Pressure-sensitive inks are materials which can be printed or otherwise applied in a thin coating which serves to limit the current flowing therethrough. When forming the sensor to detect other parameters, such as temperature, other types of sensitive coatings, such as a temperature sensitive coating, may be employed.

The construction of the bottom layer 302 is similar to that of the top layer 300. The lower conductive trace 306 is applied to the bottom substrate layer 302 in the same manner as discussed above in connection with the top layer 300. Although the top layer includes the coating 72 formed at the location 74 defining the sensor elements 60 on the upper conductive trace 304, the lower conductive trace 306 may also include a coating 72 applied thereto. An insulating layer 308 or layers (see FIG. 9, which is a diagrammatic cross-sectional view of the assembled sensor of FIG. 8, taken through a sensor element) may then be applied to at least one conductive trace to electrically insulate the upper and lower traces, but not the coating, from each other. The insulating layer 308 or layers may be glued or heat bonded to the substrate layer.

To complete the sensor, the top and bottom substrate layers with conductive traces, insulating layer or layers, and sensor elements are placed together and may then be glue or heat bonded together.

As shown in FIG. 8, in one embodiment with two substrate layers 300, 302, the pattern of the conductive trace 304, 306 on each substrate layer is similar and may be identical, except that when the two layers are positioned together, the pattern of one conductive trace layer (e.g., the lower conductive trace) is rotated with respect to the other conductive trace layer (e.g., the upper conductive trace), such that the electrical leads 230, 232 connected to the conductive traces extend out from the sensor in different directions. In one embodiment, the lower conductive trace is rotated 90 degrees relative to the upper conductive trace, e.g. in a column-like and row-like manner. However, it should be appreciated that the present invention is not limited in this respect, as other patterns are contemplated. Further, in one embodiment, the upper conductive trace 304 does not have the identical pattern as the lower conductive trace 306. However, it may be desirable for the two conductive traces 304, 306 to have like patterns for manufacturing reasons and/or so that the conductive traces minimally interfere with the placement of slits and/or cut-outs in the substrate layer. Further, an insulating or dielectric layer 308 may be positioned between the two substrate layers at least at locations where the conductive traces follow a like pattern.

Figure 12:
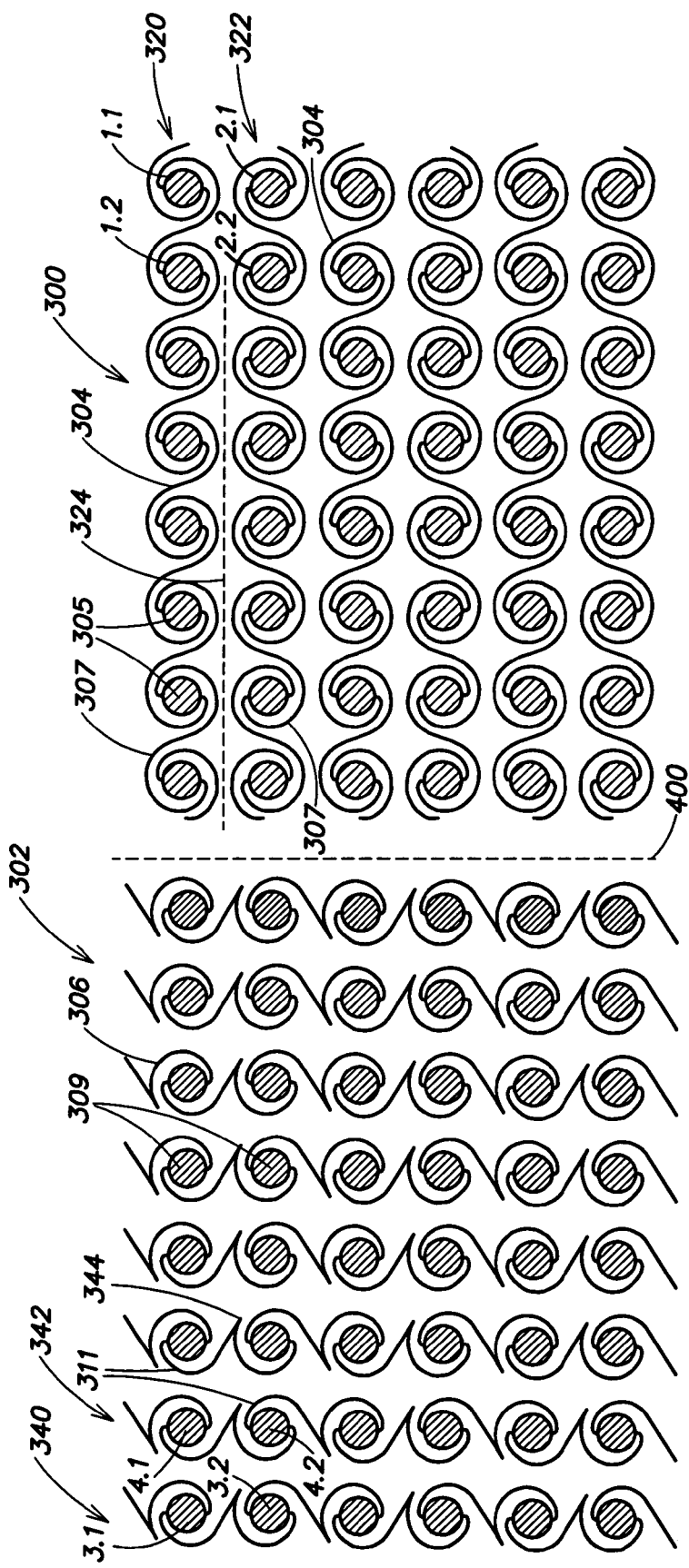
FIG. 12 is a diagrammatic representation of a portion of the conductive traces prior to assembly.
Figure 13:
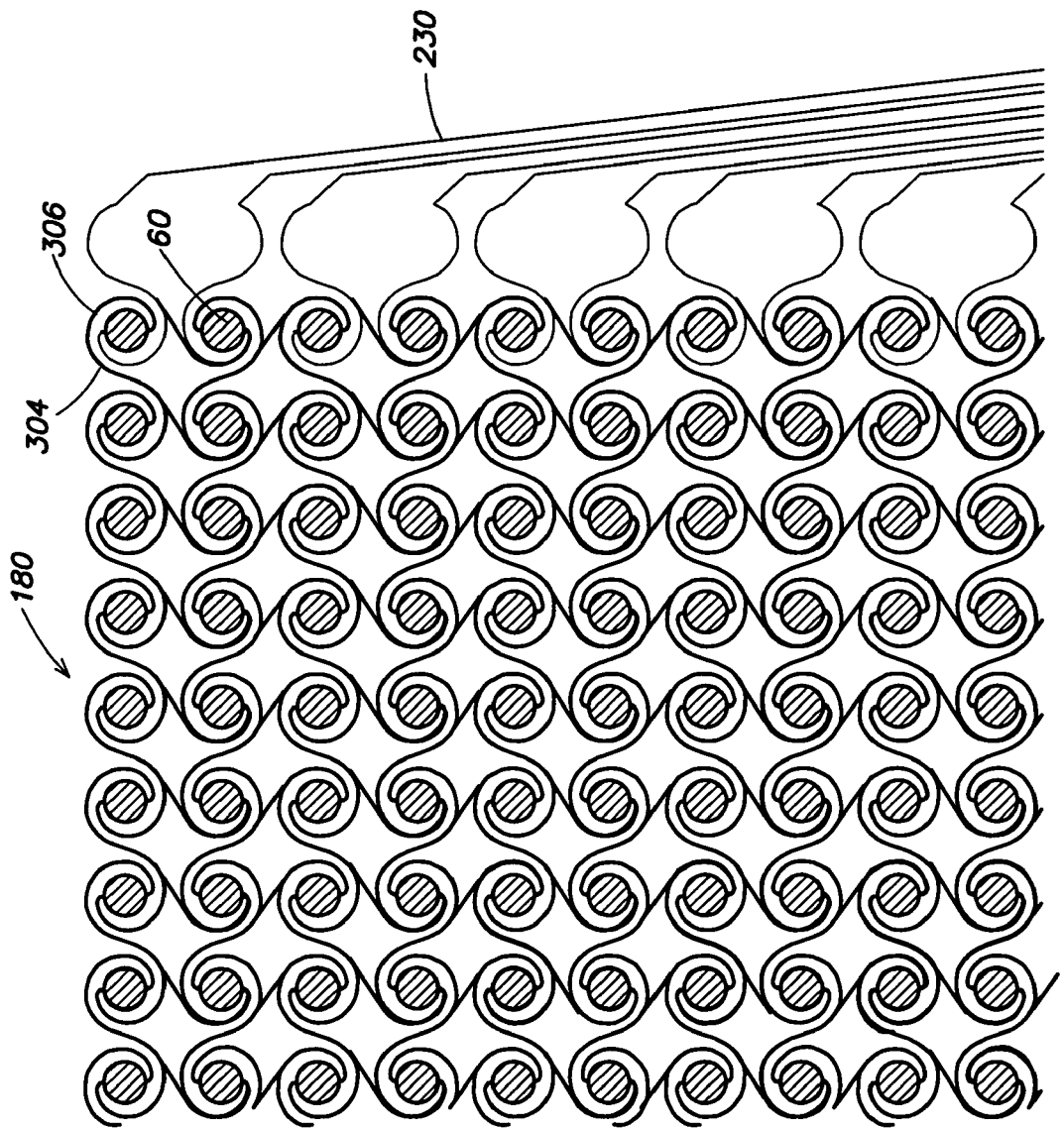
FIG. 13 is a diagrammatic representation of the conductive traces of FIG. 12 assembled to form a sensor.

Turning now to FIGS. 12 and 13, the pattern of the upper and lower conductive traces will now be described. FIG. 12 illustrates the two substrate layers 300, 302 side by side, prior to assembly. The substrate layers may be independent pieces or may be a single piece that is subsequently cut or folded along line 400. Further, a stretchable fabric layer (not shown) may be added to the sensor on one or both sides to aid in the durability and conformability of the sensor.

Although the conductive trace pattern on the upper layer 300 is different from the conductive trace pattern on the lower layer 302, when the two substrate layers are assembled together, as shown in FIG. 13, the conductive traces 304, 306 align such that a majority of the conductive trace 304 on one substrate matches the other conductive trace 306 when the layers are superimposed. As illustrated in FIG. 13, a sensor 180 with a plurality of sensor elements 60 is formed when the conductive traces 304, 306 are sandwiched between a pressure sensitive layer disposed at the locations defining the sensor elements 60. As discussed above, this arrangement of conductive traces may be advantageous because the conductive traces minimally interfere with the placement of slits and/or cut-outs in the substrate layer. In addition, the length of the slits may be maximized, thereby providing maximum sensor element movement.

As shown in the embodiment of FIG. 12, on the upper layer 300, a plurality of conductive traces 304 is disposed and each conductive trace 304 includes an enlarged area (i.e., sensor element pad 305). The main portion of the conductive trace (e.g., conductive lines 307) is arranged to extend at least partially around a sensor element pad in a spiral-like pattern. On the lower layer 302, a plurality of conductive traces 306 is disposed and each conductive trace 306 also includes an enlarged area (i.e., sensor element pad 309). The main portion of the conductive trace (e.g., conductive lines 311) is arranged to extend at least partially around a sensor element pad in a spiral-like pattern.

Referring to the upper layer 300, a first conductive trace 304 is disposed in a row 320 and extends in a first spiral-like pattern and in a first direction. A second conductive trace is disposed in a row 322 and extends in a second spiral-like pattern and in a second direction. The conductive traces 304 are arranged such that the first and second directions are substantially opposite each other. For example, as shown in the embodiment of FIG. 12, the pattern of the conductive trace in row 320 extends in an opposite direction compared to the pattern of the conductive trace in the adjacent row 322. In the embodiment of FIG. 12, the conductive trace row 320 is arranged as the mirror image of row 322 with respect to mirror image line 324. However, other patterns of the conductive trace may be used, as the present invention is not limited in this respect.

When the sensor element is formed on the conductive trace, e.g., on the sensor element pad, the conductive trace in row 320 is electrically coupled to and extends in a counter-clockwise direction at least partially around the first sensor element that would be at sensor element pad 1.1, and then extends in a clockwise direction at least partially around the first sensor element that would be at sensor element pad 1.1. The conductive trace in row 320 then is electrically coupled to and extends in a counter-clockwise direction at least partially around a second sensor element that would be at sensor element pad 1.2 and then extends in a clockwise direction at least partially around the second sensor element that would be at sensor element pad 1.2.

Conversely, the conductive trace in row 322 extends in an alternating pattern, opposite the conductive trace in the first row 320. The conductive trace in row 322 is electrically coupled to and extends in a clockwise direction at least partially around the first sensor element that would be at sensor element pad 2.1, and then extends in a counter-clockwise direction at least partially around the first sensor element that would be at sensor element pad 2.1. The conductive trace in row 322 then is electrically coupled to and extends in a clockwise direction at least partially around a second sensor element that would be at sensor element pad 2.2 and then extends in a counter-clockwise direction at least partially around the second sensor element that would be at sensor element pad 2.2.

In the embodiment illustrated in FIGS. 12 and 13, the pattern of the second (i.e., lower) conductive trace 306 is different from the pattern of the first (i.e., upper) conductive trace 304. With reference to the lower layer, a plurality of conductive traces 306 is disposed on the substrate layer. A first conductive trace is disposed in column 340 and a second conductive trace is disposed in column 342. As described above, each conductive trace extends in a spiral-like pattern. However, with the lower conductive traces, the pattern of each trace is substantially the same. That is, the pattern of the conductive trace in column 340 extends in substantially the same direction compared to the pattern of the conductive trace in adjacent column 342.

When the sensor element is formed on the conductive trace, e.g. on the sensor element pad, the conductive trace in column 340 is electrically coupled to and extends in a clockwise direction at least partially around the first sensor element that would be at sensor element pad 3.1, and then extends in a counter-clockwise direction at least partially around the first sensor element that would be at sensor element pad 3.1. The path of the conductive trace in column 340 then forms a sharp point 344 alternating the direction of its path and is electrically coupled to and extends in a counter-clockwise direction at least partially around a second sensor element that would be at sensor element pad 3.2, and then extends in a clockwise direction at least partially around the second sensor element that would be at sensor element pad 3.2.

Similarly, the conductive trace in the second column 342 extends in substantially the same pattern as the conductive trace in the first column 340. The conductive trace in column 342 is electrically coupled to and extends in a clockwise direction at least partially around the first sensor element that would be at sensor element pad 4.1, and then extends in a counter-clockwise direction at least partially around the first sensor element that would be at sensor element pad 4.1. The second column 342 then forms a sharp point 344 alternating the direction of its path and is electrically coupled to and extends in a counter-clockwise direction at least partially around the second sensor element that would be at sensor element pad 4.2, and then extends in a clockwise direction at least partially around the second sensor element that would be sensor element pad 4.2.

Although other alternating patterns of the conductive trace may be used, the above described patterns may aid with the conformability of the sensor. In this respect, the length of the conductive trace (and the slit, if employed) between sensor elements is maximized, thereby aiding an individual sensor to move substantially independently of an adjacent sensor.

In another embodiment, as shown in the cross-sectional view of FIG. 10, there is only one substrate layer 310, with a conductive trace disposed on each side of the substrate layer 310. Although a dielectric insulating layer may be implemented into the sensor to further separate the two conductive traces from each other, the substrate itself may act to insulate the conductive traces. Further in this embodiment, holes, or openings 312 in the substrate layer 310 permit a coating 72 to be layered in the opening and to contact the conductive traces to electrically connect the two conductive traces.

Figure 11:
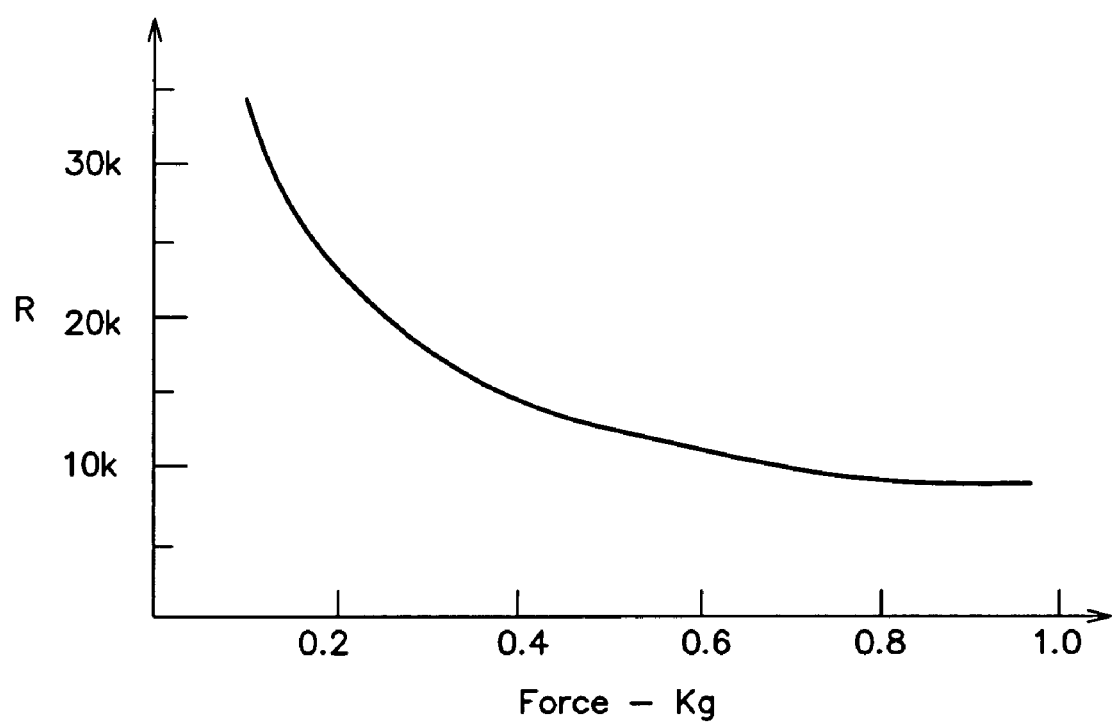
FIG. 11 is a graph showing the relationship of the pressure applied to the resistive ink material and the resistivity thereof.

When the sensor is configured as a force sensor, in one embodiment, a resistive ink is used which comprises a carbon-molybdenum disulfide based ink in an acrylic binder and which has the force versus resistance characteristics shown in FIG. 11, may be used. In FIG. 11, the vertical axis represents the measured resistance at the sensor element. The horizontal axis represents the force in kilograms applied to the sensor element by means of a ⅛ inch diameter steel ball located directly over the sensor element whose resistance is being measured.

The technology of formulating and applying resistive inks is well developed. See, for example, Screen Printing Electronic Circuits, by Albert Kasoloff, 1980; and National Bureau of Standards Circular No. 530, U.S. Government Printing Office. A resistive ink with the characteristics shown in FIG. 11 may be formulated from commercially available components. For example, the following formulation uses products from Acheson Colloids Company in Port Huron, Mich.: 80% dielectric catalog number SS24210, 10% graphite catalog number 423SS, 10% molybdenum disulfide catalog number SS24476. Other inks suitable for use with present invention include Chomerics, Inc., Woburn, Mass., product number 55-01-4402-0000; and Interlink Electronics Company, Santa Barbara, Calif., force sensing resistor formulation. It should be appreciated that other formulations may be employed as the present invention is not limited in this respect. It is beneficial for the resistive ink to be applied in as thin of a layer as possible, for example a range of 0.5 mil–2 mil is acceptable. In one embodiment, the pressure sensitive resistive ink is applied in a manner such that the resulting diameter of the sensor element is approximately 1 cm.

In one embodiment, the sensor operates within a circuit, and each sensor element is sequentially scanned to measure an electrical change of the coating to provide an indication of the parameter applied to the sensor element. If the parameter applied to a particular sensor element is low, the resistance may be high, therefore little current will flow through. However, as the value of the parameter increases, the resistance through the sensor element decreases, and therefore the current flow increases. The mapping of a particular sensor element to a physical location is done through the use of a computer or other measuring circuitry. In one embodiment, a control circuit is provided, which may adjust the sensitivity of the sensor elements to accommodate different magnitudes of parameters, such as force, pressure, temperature and/or vibration.

In one embodiment, the sensor may be used in any application which requires obtaining a parameter distribution across a surface. In particular, because the sensor is capable of conforming to the shape of a surface of a workpiece, an accurate distribution of the parameter may be obtained regardless of the irregularities and/or deflections of the surface. The ability of the sensor elements to move, (for example, perpendicular to the plane of the sensor and also within the plane of the sensor) enables the sensor to better conform to the shape of the workpiece, regardless of its shape and/or amount of deflection.

It should be appreciated that the closer the spacing between adjacent sensor elements, the greater the resolution in obtaining the parameter distribution. In one embodiment, the spacing between sensor elements may be as small as approximately 0.5 mm, although any suitable spacing may be employed.

By measuring the change in current flow at each sensor element location, the applied parameter distribution pattern can be detected. The measured parameter distribution pattern may be outputted to a data acquisition and analysis system and/or displayed on, for example, a computer screen to illustrate the measurements either statically, or dynamically, in either a 2-D or 3-D display. Once the parameter distribution is sensed, the changes may be recorded and analyzed further. For example, any of the above-mentioned illustrative embodiments of sensors may be used in combination with an apparatus for the custom fitting of a seat cushion for a wheelchair. The apparatus may include a platform that simulates a seat cushion to mount the sensor, and a controller communicating with the sensor adapted to receive data from the sensor.

In one embodiment, the sensor is arranged as a force sensor and the controller calculates a force at locations that coincide with the locations of the individual sensor elements of the sensor. Once the force data is determined, the seat cushion may be designed to minimize the existence of the pressure points, thus improving the comfort. The sensor may be used to detect force data of any surface, such as the contact force of feet, teeth, hand, machine components, rolls of a press, between mating parts, etc., as the present invention is not limited in this respect. Further applications of the present invention include mattresses, seat backs, and more generally any type of support surface.

It should be understood that the foregoing description of the invention is intended merely to be illustrative thereof and that other embodiments, modifications, and equivalents of the invention are within the scope of the invention recited in the claims appended hereto. Further, although each embodiment described above includes certain features, the invention is not limited in this respect. Thus, one or more of the above-described or other features of the sensor or methods of manufacture, may be employed singularly or in any suitable combination, as the present invention is not limited to a specific embodiment.

What is claimed is:

1. A sensor, comprising:
   at least one substrate layer;
   a plurality of individual sensor elements operatively arranged with respect to the substrate layer; and
   a first and second conductive trace disposed on the substrate layer, each conductive trace electrically coupled to at least one sensor element and each conductive trace spiraling inwardly toward and wrapping at least partially around the at least one sensor element in a spiral-like pattern.

2. The sensor of claim 1, wherein the substrate layer is constructed and arranged to allow a sensor element to move relative to another sensor element.

3. The sensor of claim 1, further comprising a plurality of slits formed in the substrate layer at locations suitable to allow a sensor element to move relative to another sensor element.

4. The sensor of claim 3, wherein at least one of the plurality of slits is formed adjacent to a portion of the conductive trace which extends around a sensor element.

5. The sensor of claim 3, wherein at least a portion of the plurality of slits is formed along a nonlinear path.

6. The sensor of claim 3, wherein at least one of the plurality of slits formed in the substrate layer intersects a second slit formed in the substrate layer, thereby forming an intersecting slit.

7. The sensor of claim 6, wherein the intersecting slit is positioned between multiple sensor elements, and wherein one of the slits of the intersecting slit extends about at least a portion of one sensor element.

8. The sensor of claim 3, wherein at least one of the plurality of slits is adjacent to at least a portion of the conductive trace positioned between multiple sensor elements and at least a portion of the conductive trace which extends around a sensor element.

9. The sensor of claim 3, wherein a slit has first and second end points, wherein at least one end point is formed with a hole to relieve stress at the end point and thereby reduce the likelihood of the substrate layer from tearing at the end point.

10. The sensor of claim 3, wherein a slit has first and second end points, wherein at least one end point is formed in a hook-shape, such that if the substrate layer is subjected to relatively high stress at an end point, the substrate layer may tear, with an end of the tear terminating into the slit.

11. The sensor of claim 1, further comprising a plurality of cut-outs formed in the substrate layer at locations suitable to allow a sensor element to move relative to another sensor element.

12. The sensor of claim 11, wherein at least one cut-out formed in the substrate layer is positioned between multiple sensor elements and is generally diamond or kite shaped.

13. The sensor of claim 12, wherein the generally diamond or kite shaped cut-out includes a tail section extending about at least a portion of one sensor element.

14. The sensor of claim 1, wherein a sensor element comprises a pressure sensitive layer.

15. The sensor of claim 14, wherein the pressure sensitive layer comprises a conductive ink.

16. The sensor of claim 1, wherein the plurality of individual sensor elements is arranged on the substrate layer in an array of rows and columns.

17. The sensor of claim 16, wherein each sensor element is located at an intersection of a row and a column.

18. The sensor of claim 16, wherein the rows of sensor elements and the columns of sensor elements form an angle which is less than 90 degrees.

19. The sensor of claim 1, wherein the plurality of sensor elements defines a sensor plane, and wherein the substrate layer is constructed and arranged to allow a sensor to move in a direction perpendicular to the sensor plane and in a direction parallel to the sensor plane, with movement in the direction parallel to the sensor plane being less than the movement in the direction perpendicular to the sensor plane.

20. The sensor of claim 1, wherein each conductive trace is coupled to a sensor element at more than one location on the sensor element and wherein each conductive trace extends in a partial spiral-like pattern around a respective sensor element.

21. The sensor of claim 1, wherein at least a plurality of sensor elements is configured to detect a force, in combination with an apparatus for the custom fitting of a wheelchair seat or seat cushion, wherein the apparatus comprises:
   a platform to which the sensor is mounted; and
   a controller communicating with the sensor, wherein the controller is adapted to receive data from the sensor and calculate a force at locations coincident with locations of individual sensor elements upon the sensor being subjected to a force.

22. The sensor of claim 1, wherein the substrate layer comprises a first substrate layer and a second substrate layer, wherein the plurality of individual sensor elements is disposed between the first and second substrate layers, and wherein the first conductive trace is disposed on the first substrate layer and the second conductive trace is disposed on the second substrate layer.

23. The sensor of claim 22, further comprising an insulating layer positioned between the first and second substrate layers.

24. The sensor of claim 1, wherein the first conductive trace comprises a plurality of first conductive traces disposed on the at least one substrate layer, wherein a first one of the conductive traces extends at least partially around one of the plurality of individual sensor elements in a first spiral-like pattern and in a first direction, and wherein a second one of the first conductive traces extends at least partially around another one of the plurality of individual sensor elements in a second spiral-like pattern and in a second direction, wherein the first and second directions are substantially opposite each other.

25. The sensor of claim 24, wherein:
   the plurality of individual sensor elements comprises a first plurality of individual sensor elements arranged in a first row and a second plurality of individual sensor elements arranged in a second row,
   the first one of the first conductive traces is electrically coupled to and extends in a counter-clockwise direction at least partially around a first one of the first plurality of individual sensor elements in the first row, then extends in a clockwise direction at least partially around the first one of the first plurality of individual sensor elements in the first row, then is electrically coupled to and extends in a counter-clockwise direction at least partially around a second one of the first plurality of individual sensor elements in the first row, then extends in a clockwise direction at least partially around the second one of the first plurality of individual sensor elements in the first row; and
   the second of the first conductive traces is electrically coupled to and extends in a clockwise direction at least partially around a first one of the second plurality of individual sensor elements in the second row, then extends in a counter-clockwise direction at least partially around the first one of the second plurality of individual sensor elements in the second row, then is electrically coupled to and extends in a clockwise direction at least partially around a second one of the second plurality of individual sensor elements in the second row, then extends in a counter-clockwise direction at least partially around the second one of the second plurality of individual sensor elements in the second row.

26. The sensor of claim 1 or 25, wherein the second conductive trace comprises a plurality of second conductive traces disposed on the at least one substrate layer, wherein a first one of the second conductive traces extends at least partially around one of the plurality of individual sensor elements in a first spiral-like pattern and in a first direction, and wherein a second one of the second conductive traces extends at least partially around another one of the plurality of individual sensor elements in a second spiral-like pattern and in a second direction, wherein the first and second directions are substantially the same as each other.

27. The sensor of claim 26, wherein:
   the plurality of individual sensor elements comprises a first plurality of individual sensor elements arranged in a first column and a second plurality of individual sensor elements arranged in a second column,
   the first one of the second conductive traces is electrically coupled to and extends in a clockwise direction at least partially around a first one of the first plurality of individual sensor elements in the first column, then extends in a counter-clockwise direction at least partially around the first one of the first plurality of individual sensor elements in the first column, then is electrically coupled to and extends in a counter-clockwise direction at least partially around a second one of the first plurality of individual sensor elements in the first column, then extends in a clockwise direction at least partially around the second one of the first plurality of individual sensor elements in the first column; and
   the second of the second conductive traces is electrically coupled to and extends in a clockwise direction at least partially around a first one of the second plurality of individual sensor elements in the second column, then extends in a counter-clockwise direction at least partially around the first one of the second plurality if individual sensor elements in the second column, then is electrically coupled to and extends in a counter-clockwise direction at least partially around a second one of the second plurality of individual sensor elements in the second column, then extends in a clockwise direction at least partially around the second one of the second plurality of individual sensor elements in the second column.

28. A sensor, adapted to conform to the shape of a surface, comprising:
a substrate comprising a first substrate layer and second substrate layer; and
a plurality of individual sensor elements, for measuring a desired parameter, the plurality of sensor elements defining a sensor plane, each sensor element being formed, at least in part, with an upper conductive trace disposed on the first substrate layer and a lower conductive trace disposed on the second substrate layer, the sensor elements are arranged with respect to the substrate in a manner that allows each sensor element to move in a direction perpendicular to the sensor plane and substantially independent of an adjacent sensor element moving in a direction perpendicular to the sensor plane.

29. The sensor of claim 28, wherein the substrate layer is formed of a thin, flexible material and is constructed and arranged to allow a sensor element to move relative to another sensor element.

30. The sensor of claim 28, further comprising a plurality of slits formed in the substrate layer at locations suitable to allow a sensor element to move relative to another sensor element.

31. The sensor of claim 30, wherein each of the plurality of slits are formed along a nonlinear path.

32. The sensor of claim 30, wherein at least one of the plurality of slits formed in the substrate layer intersects a second slit formed in the substrate, thereby forming an intersecting slit.

33. The sensor of claim 32, wherein the intersecting slit is positioned between multiple sensor elements, and wherein one of the slits of the intersecting slit extends about at least a portion of one sensor element.

34. The sensor of claim 30, wherein a slit has first and second end points, wherein at least one end point is formed with a hole to relieve stress at the end point and thereby reduce the likelihood of the substrate layer from tearing at the end point.

35. The sensor of claim 30, wherein a slit has first and second end points, wherein at least one end point is formed in a hook-shape, such that if the substrate layer is subjected to relatively high stress at the end point, the substrate layer may tear, with an end of the tear terminating into the slit.

36. The sensor of claim 28, wherein the plurality of sensor elements is arranged on a substrate layer, wherein the substrate layer comprises a plurality of cut-outs at locations suitable to allow a sensor element to move relative to another sensor element.

37. The sensor of claim 36, wherein at least one cut-out formed in the substrate layer is positioned between multiple sensor elements and is generally diamond or kite shaped.

38. The sensor of claim 37, wherein the generally diamond or kite shaped cut-out includes a tail section extending about at least a portion of one sensor element.

39. The sensor of claim 28, wherein at least one sensor element comprises a pressure sensitive layer.

40. The sensor of claim 39, wherein the pressure sensitive layer comprises a conductive ink.

41. The sensor of claim 28, wherein the plurality of sensor elements is arranged on a substrate layer in an array of rows and columns.

42. The sensor of claim 41, wherein each sensor element is located at an intersection of a row and a column.

43. The sensor of claim 28, wherein at least a plurality of sensor elements is configured to detect a force, in combination with an apparatus for the custom fitting of a wheelchair seat or seat cushion, wherein the apparatus comprises:
a platform to which the sensor is mounted; and
a controller communicating with the sensor, wherein the controller is adapted to receive data from the sensor and calculate a force at locations coincident with locations of individual sensor elements of the sensor upon the sensor being subjected to a force.

44. The sensor of claim 30, wherein two slits are formed between multiple adjacent sensors, with the two slits together resembling an hour-glass shape.

45. The sensor of claim 28, further comprising a first conductive trace, wherein the first conductive trace comprises a plurality of first conductive traces disposed on the substrate layer, wherein a first one of the conductive traces extends at least partially around one of the plurality of individual sensor elements in a first spiral-like pattern and in a first direction, and wherein a second one of the first conductive traces extends at least partially around another one of the plurality of individual sensor elements in a second spiral-like pattern and in a second direction, wherein the first and second directions are substantially opposite each other.

46. The sensor of claim 45, wherein:
the plurality of individual sensor elements comprises a first plurality of individual sensor elements arranged in a first row and a second plurality of individual sensor elements arranged in a second row,
the first one of the first conductive traces is electrically coupled to and extends in a counter-clockwise direction at least partially around a first one of the first plurality of individual sensor elements in the first row, then extends in a clockwise direction at least partially around the first one of the first plurality of individual sensor elements in the first row, then is electrically coupled to and extends in a counter-clockwise direction at least partially around a second one of the first plurality of individual sensor elements in the first row, then extends in a clockwise direction at least partially around the second one of the first plurality of individual sensor elements in the first row; and
the second of the first conductive traces is electrically coupled to and extends in a clockwise direction at least partially around a first one of the second plurality of individual sensor elements in the second row, then extends in a counter-clockwise direction at least partially around the first one of the second plurality of individual sensor elements in the second row, then is electrically coupled to and extends in a clockwise direction at least partially around a second one of the second plurality of individual sensor elements in the second row, then extends in a counter-clockwise direction at least partially around the second one of the second plurality of individual sensor elements in the second row.

47. The sensor of claim 28 or 46, further comprising a second conductive trace, wherein the second conductive trace comprises a plurality of second conductive traces disposed on the substrate layer, wherein a first one of the second conductive traces extends at least partially around one of the plurality of individual sensor elements in a first spiral-like pattern and in a first direction, and wherein a second one of the second conductive traces extends at least partially around another one of the plurality of individual sensor elements in a second spiral-like pattern and in a second direction, wherein the first and second directions are substantially the same as each other.

48. The sensor of claim 47, wherein:
the plurality of individual sensor elements comprises a first plurality of individual sensor elements arranged in a first column and a second plurality of individual sensor elements arranged in a second column,
the first one of the second conductive traces is electrically coupled to and extends in a clockwise direction at least partially around a first one of the first plurality of individual sensor elements in the first column, then extends in a counter-clockwise direction at least partially around the first one of the first plurality of individual sensor elements in the first column, then is electrically coupled to and extends in a counter-clockwise direction at least partially around a second one of the first plurality of individual sensor elements in the first column, then extends in a clockwise direction at least partially around the second one of the first plurality of individual sensor elements in the first column; and
the second of the second conductive traces is electrically coupled to and extends in a clockwise direction at least partially around a first one of the second plurality of individual sensor elements in the second column, then extends in a counter-clockwise direction at least partially around the first one of the second plurality if individual sensor elements in the second column, then is electrically coupled to and extends in a counter-clockwise direction at least partially around a second one of the second plurality of individual sensor elements in the second column, then extends in a clockwise direction at least partially around the second one of the second plurality of individual sensor elements in the second column.

49. A sensor array, for measuring a desired parameter, comprising:
at least one substrate layer;
a plurality of individual sensor elements operatively arranged with respect to the substrate layer, defining a sensor plane;
a plurality of conductive traces connecting the sensor elements, wherein each sensor element is in direct electrical contact with at least one respective conductive trace; and
a plurality of slits formed in the substrate layer, wherein the slits are arranged between each adjacent sensor element, wherein the slits permit a sensor element to move perpendicular to the sensor plane.

50. The sensor of claim 49, wherein the substrate layer is constructed and arranged to allow a sensor element to move relative to another sensor element.

51. The sensor of claim 49, wherein each of the plurality of slits are formed along a nonlinear path.

52. The sensor of claim 49, wherein at least one of the plurality of slits formed in the substrate layer intersects a second slit formed in the substrate, thereby forming an intersecting slit.

53. The sensor of claim 52, wherein the intersecting slit is positioned between multiple sensor elements, and wherein one of the slits of the intersecting slit extends about at least a portion of one sensor element.

54. The sensor of claim 49, wherein a slit has first and second end points, wherein at least one end point is formed with a hole to relieve stress at the end point and thereby reduce the likelihood of the substrate layer from tearing at the end point.

55. The sensor of claim 49, wherein each slit has first and second end points, wherein an end point is formed in a hook-shape, such that if the substrate layer is subjected to relatively high stress at an end point, the substrate layer may tear, with an end of the tear terminating into the slit.

56. The sensor of claim 49, wherein at least one sensor comprises a pressure sensitive layer.

57. The sensor of claim 56, wherein the pressure sensitive layer comprises a conductive ink.

58. The sensor of claim 49, wherein the plurality of sensor elements is arranged on the substrate layer in an array of rows and columns.

59. The sensor of claim 58, wherein each sensor element is located at an intersection of a row and a column.

60. The sensor of claim 49, wherein at least a plurality of sensor elements is configured to detect a force, in combination with an apparatus for the custom fitting of a wheelchair seat or seat cushion, wherein the apparatus comprises:
a platform to which the sensor is mounted; and
a controller communicating with the sensor, wherein the controller is adapted to receive data from the sensor and calculate a force at locations coincident with locations of individual sensor elements upon the sensor being subjected to a force.

61. The sensor of claim 58, wherein the rows of sensor elements and the columns of sensor elements form an angle which is less than 90 degrees and wherein two slits are formed between multiple sensors, with the two slits together resembling an hour-glass shape.

62. The sensor of claim 49, wherein the substrate layer is formed of a thin, flexible material.

63. The sensor of claim 49, further comprising a first conductive trace, wherein the first conductive trace comprises a plurality of first conductive traces disposed on the at least one substrate layer, wherein a first one of the conductive traces extends at least partially around one of the plurality of individual sensor elements in a first spiral-like pattern and in a first direction, and wherein a second one of the first conductive traces extends at least partially around another one of the plurality of individual sensor elements in a second spiral-like pattern and in a second direction, wherein the first and second directions are substantially opposite each other.

64. The sensor of claim 63, wherein:
the plurality of individual sensor elements comprises a first plurality of individual sensor elements arranged in a first row and a second plurality of individual sensor elements arranged in a second row,
the first one of the first conductive traces is electrically coupled to and extends in a counter-clockwise direction at least partially around a first one of the first plurality of individual sensor elements in the first row, then extends in a clockwise direction at least partially around the first one of the first plurality of individual sensor elements in the first row, then is electrically coupled to and extends in a counter-clockwise direction at least partially around a second one of the first plurality of individual sensor elements in the first row, then extends in a clockwise direction at least partially around the second one of the first plurality of individual sensor elements in the first row; and
the second of the first conductive traces is electrically coupled to and extends in a clockwise direction at least partially around a first one of the second plurality of individual sensor elements in the second row, then extends in a counter-clockwise direction at least partially around the first one of the second plurality of individual sensor elements in the second row, then is electrically coupled to and extends in a clockwise direction at least partially around a second one of the second plurality of individual sensor elements in the second row, then extends in a counter-clockwise direction at least partially around the second one of the second plurality of individual sensor elements in the second row.

65. The sensor of claim 49 or 64, further comprising a second conductive trace, wherein the second conductive trace comprises a plurality of second conductive traces disposed on the at least one substrate layer, wherein a first one of the second conductive traces extends at least partially around one of the plurality of individual sensor elements in a first spiral-like pattern and in a first direction, and wherein a second one of the second conductive traces extends at least partially around another one of the plurality of individual sensor elements in a second spiral-like pattern and in a second direction, wherein the first and second directions are substantially the same as each other.

66. The sensor of claim 65, wherein:
the plurality of individual sensor elements comprises a first plurality of individual sensor elements arranged in a first column and a second plurality of individual sensor elements arranged in a second column,
the first one of the second conductive traces is electrically coupled to and extends in a clockwise direction at least partially around a first one of the first plurality of individual sensor elements in the first column, then extends in a counter-clockwise direction at least partially around the first one of the first plurality of individual sensor elements in the first column, then is electrically coupled to and extends in a counter-clockwise direction at least partially around a second one of the first plurality of individual sensor elements in the first column, then extends in a clockwise direction at least partially around the second one of the first plurality of individual sensor elements in the first column; and
the second of the second conductive traces is electrically coupled to and extends in a clockwise direction at least partially around a first one of the second plurality of individual sensor elements in the second column, then extends in a counter-clockwise direction at least partially around the first one of the second plurality if individual sensor elements in the second column, then is electrically coupled to and extends in a counter-clockwise direction at least partially around a second one of the second plurality of individual sensor elements in the second column, then extends in a clockwise direction at least partially around the second one of the second plurality of individual sensor elements in the second column.

67. A force sensor, for measuring a force applied to a surface, comprising:
first and second thin, flexible substrate layers, the layers arranged in facing relationship to each other;
a first plurality of conductive traces formed on the first substrate layer and a second plurality of conductive traces formed on the second substrate layer, with the first and the second conductive traces facing each other;
a plurality of individual force sensor elements disposed between the first and the second substrate layers, and electrically connected to the first and second conductive traces, the first and second conductive traces each having a portion that extends from and partially around the sensor element in a spiral-like pattern; and
a plurality of slits formed through the first and second substrate layers, wherein the slits permit the sensor elements to move, thereby allowing a sensor element to move relative to adjacent sensor elements.

68. The sensor of claim 67, wherein the plurality of sensor elements is arranged in an array of rows and columns.

69. The sensor of claim 68, wherein the rows of sensor elements and the columns of sensor elements form an angle which is less than 90 degrees and wherein two slits are formed between multiple sensors, with the two slits together resembling an hour-glass shape.

70. The sensor of claim 67, wherein each sensor element comprises a pressure sensitive ink.

71. The sensor of claim 67, wherein at least a plurality of sensor elements is configured to detect a force, in combination with an apparatus for the custom fitting of a wheelchair seat or seat cushion, wherein the apparatus comprises:
a platform to which the sensor is mounted; and
a controller communicating with the sensor, wherein the controller is adapted to receive data from the sensor and calculate a force at locations coincident with locations of individual sensor elements upon the sensor being subjected to a force.

72. The sensor of claim 67, wherein the first conductive traces comprises a plurality of first conductive traces disposed on the first substrate layer, wherein a first one of the conductive traces extends at least partially around one of the plurality of individual sensor elements in a first spiral-like pattern and in a first direction, and wherein a second one of the first conductive traces extends at least partially around another one of the plurality of individual sensor elements in a second spiral-like pattern and in a second direction, wherein the first and second directions are substantially opposite each other.

73. The sensor of claim 72, wherein:
the plurality of individual sensor elements comprises a first plurality of individual sensor elements arranged in a first row and a second plurality of individual sensor elements arranged in a second row,
the first one of the first conductive traces is electrically coupled to and extends in a counter-clockwise direction at least partially around a first one of the first plurality of individual sensor elements in the first row, then extends in a clockwise direction at least partially around the first one of the first plurality of individual sensor elements in the first row, then is electrically coupled to and extends in a counter-clockwise direction at least partially around a second one of the first plurality of individual sensor elements in the first row, then extends in a clockwise direction at least partially around the second one of the first plurality of individual sensor elements in the first row; and
the second of the first conductive traces is electrically coupled to and extends in a clockwise direction at least partially around a first one of the second plurality of individual sensor elements in the second row, then extends in a counter-clockwise direction at least partially around the first one of the second plurality of individual sensor elements in the second row, then is electrically coupled to and extends in a clockwise direction at least partially around a second one of the second plurality of individual sensor elements in the second row, then extends in a counter-clockwise direction at least partially around the second one of the second plurality of individual sensor elements in the second row.

74. The sensor of claim 67 or 73, wherein the second conductive traces comprises a plurality of second conductive traces disposed on the second substrate layer, wherein a first one of the second conductive traces extends at least partially around one of the plurality of individual sensor elements in a first spiral-like pattern and in a first direction, and wherein a second one of the second conductive traces extends at least partially around another one of the plurality of individual sensor elements in a second spiral-like pattern and in a second direction, wherein the first and second directions are substantially the same as each other.

75. The sensor of claim 74, wherein:

the plurality of individual sensor elements comprises a first plurality of individual sensor elements arranged in a first column and a second plurality of individual sensor elements arranged in a second column, the first one of the second conductive traces is electrically coupled to and extends in a clockwise direction at least partially around a first one of the first plurality of individual sensor elements in the first column, then extends in a counter-clockwise direction at least partially around the first one of the first plurality of individual sensor elements in the first column, then is electrically coupled to and extends in a counter-clockwise direction at least partially around a second one of the first plurality of individual sensor elements in the first column, then extends in a clockwise direction at least partially around the second one of the first plurality of individual sensor elements in the first column; and the second of the second conductive traces is electrically coupled to and extends in a clockwise direction at least partially around a first one of the second plurality of individual sensor elements in the second column, then extends in a counter-clockwise direction at least partially around the first one of the second plurality if individual sensor elements in the second column, then is electrically coupled to and extends in a counter-clockwise direction at least partially around a second one of the second plurality of individual sensor elements in the second column, then extends in a clockwise direction at least partially around the second one of the second plurality of individual sensor elements in the second column.

* * * * *